(12) United States Patent
Mita et al.

(10) Patent No.: US 6,388,394 B1
(45) Date of Patent: May 14, 2002

(54) HIGH-INTENSITY DISCHARGE LAMP LIGHTING DEVICE AND LIGHTING SYSTEM

(75) Inventors: Kazutoshi Mita; Hisashi Honda; Seiji Ashida, all of Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/590,267

(22) Filed: Jun. 9, 2000

(30) Foreign Application Priority Data

Jun. 10, 1999 (JP) ............................. 11-163793
Sep. 3, 1999 (JP) ............................. 11-249832
Dec. 8, 1999 (JP) ............................. 11-349539

(51) Int. Cl.$^7$ ................................. G05F 1/00
(52) U.S. Cl. .............. 315/291; 315/209 R; 315/246; 315/DIG. 7; 313/623
(58) Field of Search .................... 315/246, 209 R, 315/247, 307, 291, DIG. 5, DIG. 7; 313/318, 623–625

(56) References Cited

U.S. PATENT DOCUMENTS 4,749,905 A * 6/1988 Mori et al. .............. 313/623
4,973,880 A * 11/1990 Honda et al. ............. 313/633
4,992,703 A * 2/1991 Ramaiah .................. 315/261
5,491,388 A * 2/1996 Nobuyuki et al. ......... 315/308
5,998,939 A * 12/1999 Fellows et al. ........... 315/246
6,020,691 A * 2/2000 Sun et al. ................. 315/307

* cited by examiner

Primary Examiner—Haissa Philogene
(74) Attorney, Agent, or Firm—Pillsbury Winthrop

(57) ABSTRACT

A high-intensity discharge lamp lighting device includes a high-intensity discharge lamp containing a light-transmissive discharge enclosure having an envelope defining a discharge space and a hollow member having an inner diameter smaller than the envelope, an elongate electrode being inserted into the hollow member of the light-transmissive discharge enclosure in leaving a narrow gap from the inner wall of the hollow member and having leading end protruding into the hollow member of the light-transmissive discharge enclosure, a lead-conductor having a leading end coupled to an base end of the electrode, a middle portion attached to the light-transmissive discharge enclosure and a base end exposing outward from the light-transmissive discharge enclosure, and discharge agent including at least neon and argon and filled into the light-transmissive discharge enclosure, and lighting circuit means having a load characteristics continuous from a secondary open-circuit voltage to a secondary short-circuit current for lighting the high-intensity discharge lamp at a high-frequency.

13 Claims, 16 Drawing Sheets

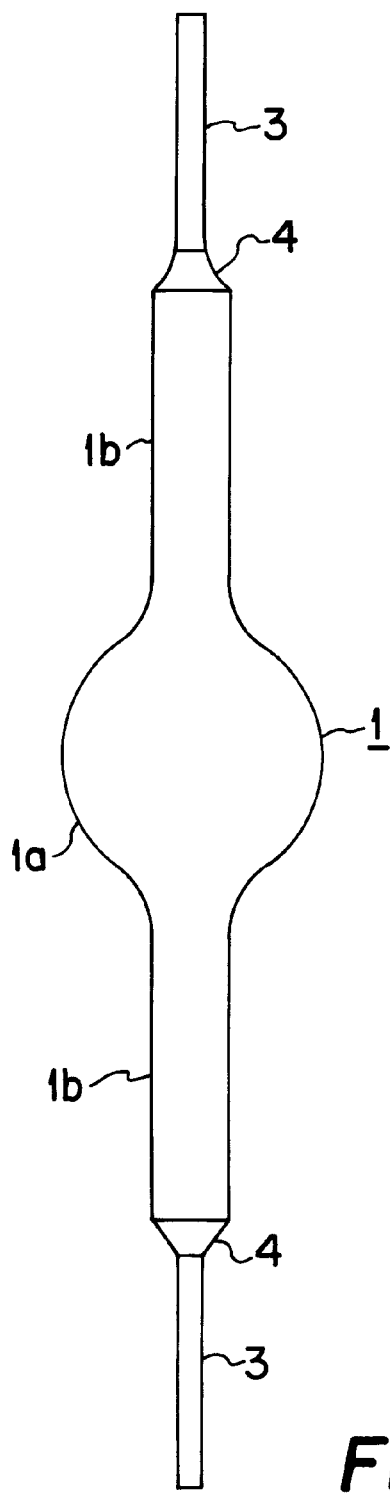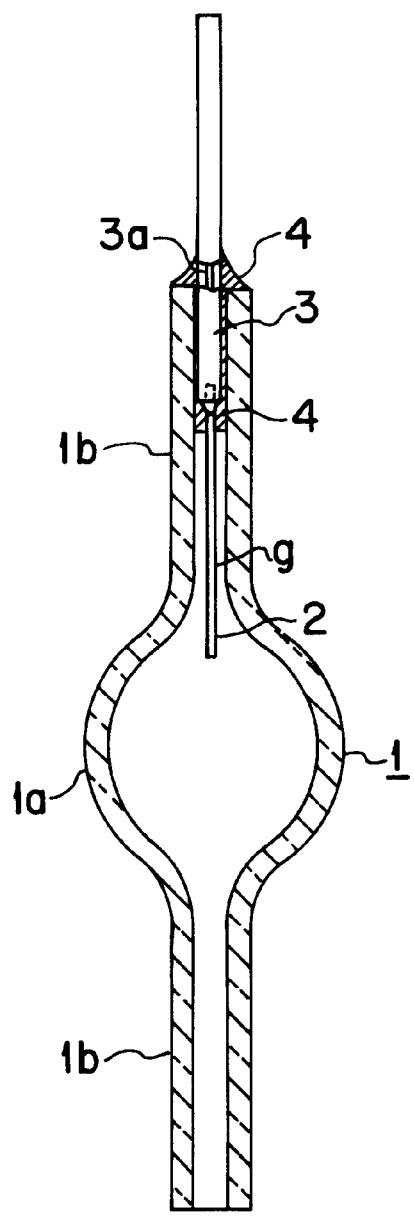
FIG. 11
FIG. 12

HIGH-INTENSITY DISCHARGE LAMP LIGHTING DEVICE AND LIGHTING SYSTEM

FIELD OF THE INVENTION

The present invention relates to a high-intensity discharge lamp lighting device and a lighting system, which is able to start lighting the high-intensity discharge lamp with compact lighting circuit means.

BACKGROUND OF THE INVENTION

Recently, a compact metal halide lamp with a lighting power in a range of 10–30 W has been developed as a light source for optical fibers or a light source for halogen light bulb substitution. In such a metal halide lamp, the lighting efficiency is three or four times that the halogen light bulb, and remarkably smaller than the fluorescent lamp so as to be used as the light source.

Accordingly, the metal halide lamp as mentioned above is a light source having the advantages of the halogen light bulb and the electric bulb fluorescent lamp. However, since it is a high-intensity discharge lamp, it needs a stabilizer, i.e., lighting circuit means incorporating therein an igniter for generating a relatively high pulse voltage at the starting operation or lighting circuit means not incorporating therein an igniter, and an igniter separated from the lighting circuit means. As a matter of course, though the fluorescent lamp also needs lighting circuit means since it is also the discharge lamp, lighting circuit means of the high-intensity discharge lamp is overwhelmingly large in comparison with that of the electric bulb fluorescent lamp. Thus, even though a compact high-intensity discharge lamp would be developed for all troubles, an overall system containing a light source, a stabilizer, i.e., lighting circuit means and a lighting apparatus unwillingly has a large size.

To solve the above problem, the inventor has contemplated using a lighting circuit means principally comprising a compact high-frequency inverter, which is used for the fluorescent lamp especially for the electric bulb fluorescent lamp. This lighting circuit means for the electric bulb shaped fluorescent lamp is generally simple in its circuit arrangement, and works at a high-frequency. Accordingly, such a stabilizer is compact, light in weight and less-expensive.

However, when a high-intensity discharge lamp is lighted using such compact lighting circuit means for the fluorescent lamp, an intense blackening occurs at a starting operation.

As a result, the inventor has made investigations in detail about the cause and the measure of the blackening, and the following conclusions have been obtained. (1) Materials of the blackening are principally constituted by tungsten constituting electrodes.

(2) The blackening is caused by the fact that the tungsten of the electrodes evaporates at the starting operation, especially at the glow-arc transition. Then the tungsten sticks on the inner surface of the light-transmissive ceramic discharge enclosure.

Further to the conclusion, it is clarified that as a result of another investigation about the behavior of the electrode at the glow-arc transition in comparison with the lighting circuit of the conventional high-intensity discharge lamp which does not cause such a blackening at the starting operation, the blackening is caused by the difference of load characteristics between the fluorescent lamp lighting circuit and the high-intensity discharge lamp lighting device.

FIG. 1 is a graph showing load characteristics of a high-intensity discharge lamp lighting circuit means and a fluorescent lamp lighting circuit means.

In FIG. 1, the horizontal axis represents a current and the vertical axis represents a voltage.

In FIG. 1, also the curve A shows the load characteristics of the high-intensity discharge lamp stabilizer, and the curve B shows the load characteristics of the fluorescent lamp stabilizer. Here, as the rated operation points of the high-intensity discharge lamp of both stabilizers occur in a voltage range of 72–75 V and the current is in a range of 280–340 mA of the load characteristics, the rated operation points of the two types of the stabilizers are almost same.

However, the load characteristics of the high-intensity discharge lamp stabilizer, as shown in the characteristic curve A, the secondary open-circuit voltage V20 is relatively low, but the secondary short-circuit current Is is relatively high. This is because a higher pulse voltage is generated by an igniter at a starting operation, and then superposed to the output voltage of the stabilizer and lastly the superposed voltage is supplied to the lamp, so that, the stabilizer is not required to generate a much high voltage at the starting time. Further since the lamp voltage is low at the starting time in the high-intensity discharge lamp the lamp current is enlarged.

On the other hand, as shown in the curve B, in the load characteristics of the fluorescent lamp stabilizer, the secondary open-circuit voltage V20 is relatively high but the secondary short-circuit current is relatively slow. Then, the curve B smoothly extends across these two points. Accordingly, in the lower current region corresponding to the glow-arc transition time, e.g., in the region lower than the 30 mA, a secondary supply voltage is higher than the load characteristics of the high-intensity discharge lamp stabilizer.

Further, as the result of determining a glow power at the glow-arc transition, the glow power in the case of using the fluorescent lamp stabilizer was several times higher than that in the case of using the high-intensity discharge lamp stabilizer.

From the above facts, it is thought that the blackening is caused by the evaporation of the tungsten constituting electrodes under an excessive glow power.

On the other hand, it has been found that the blackening is influenced by a glow-arc transition time. That is, in a case of lighting a high-intensity discharge lamp provided with a silica glass discharge enclosure by a stabilizer, i.e., a lighting circuit means for conventional and typical coil and iron-core type high-intensity discharge lamp, a blackening occurring at a starting time is caused by spattering of tungsten electrodes due to mercury ions and rare gas ions during glow-discharge. Thus conventionally it was considered that the glow-arc transition time should be as short as possible for suppressing the blackening.

However, according to studies of the inventor, in the high-intensity discharge lamp provided with the light-transmissive ceramic discharge enclosure, it was found that in much shorter glow-arc transition time the blackening is accelerated due to a specific construction and a unique behavior of the discharge enclosure. On the contrary it was found that in much longer glow-arc transition time the blackening is also accelerated.

Here, a relation between the glow-arc transition time and the blackening will be explained.

That is, a high-intensity discharge lamp provided with a light-transmissive ceramic enclosure is comprised of an envelope defining a discharge space and small diameter cylinder portions communicating with the envelope. An electrode supporting portion is inserted inside the small diameter cylinder portion thus defining a narrow gap called a capillary between the inner wall of the small-diameter cylinder portion and the electrode supporting portion. When the high-intensity discharge lamp operates at a stable lighting condition, a surplus discharge agent resides at a liquid-phase in a bottom of the narrow gap and its surface presents a coldest portion in the lamp. Thus during a delighting of the high-intensity discharge lamp a large amount of the discharge agent deposits in the narrow gap and contacts to the electrode at the liquid-phase or a solid phase.

When the high-intensity discharge lamp is started, the whole electrode supporting portion in the narrow gap and the main portion of the electrode operate as an electrode and thus a glow discharge occurs around them. At this time, a part of a glow-arc transition power is consumed for evaporating the discharge agent. Thus almost the entire discharge agent temporarily evaporates. This delays a temperature rise to a glow-arc transition temperature required for the glow-arc transition and thus lengthens the glow-arc transition time. In case of the glow-arc transition time being much longer, the spattering of the electrode material become prominent and thus causes the blackening. The glow-arc transition time is also influenced by an amount and a kind of discharge agent. In the discharge agent a combination of Na, Tl and In or a combination of Na, Tl and Dy can be considered as the discharge agent, but they could not improve the glow-arc transition time.

On the other hand, it is considered to increase whole making voltage at a starting time for the to the high-intensity discharge lamp more than a minimum glow-arc transition power for moderately suppressing the glow-arc transition time. However, an excess supply of the glow power causes excessive heating of the electrode. Then an excess amount of electrode evaporation is caused which accelerates the blackening.

After the operation of the high-intensity discharge lamp has transferred from the glow discharge to the arc discharge, an arc-spot generates on the main portion of the electrode. Then, the surplus discharge agent again coagulates in the bottom of the narrow gap and resides at the liquid phase and its surface presents a coldest portion in the lamp. Then the high-intensity discharge lamp lights stably.

In a case of a high-intensity discharge lamp provided with a silica glass discharge enclosure, a coldest portion is formed on a part of the electrode, apart from a portion of the electrode in the envelope defining a discharge space. Thus it is considered that making the glow-arc transition time as short as possible is effective to suppress the blackening. To our knowledge, there is no document discussing the blackening in a case that a high-intensity discharge lamp is lighted by a lighting circuit means for use in a high-frequency lighting of a fluorescent lamp.

Furthermore, for lighting high-intensity discharge lamps it is required to always avoid an occurrence of acoustic resonance phenomenon. Here, the acoustic resonance phenomenon will be described. Conventionally a variety of proposals have been made for avoiding the acoustic resonance phenomenon. Among them, a simple and effective approach is to light high-intensity discharge lamps at an operation frequency distinctly lower than the resonance frequency of the high-intensity discharge lamps. The resonance frequency of the high-intensity discharge lamps varies in accordance with the shape and the size of the discharge space in the light-transmissive discharge enclosure. If in particular the shape of the discharge space is a complicated shape, e.g., a cylindrical shape, multiple modes of resonance frequencies yield. Therefore if the high-intensity discharge lamp is not lighted by an operation frequency distinctly lower than a fundamental mode of frequency, i.e., the lowest frequency among the multiple modes of resonance frequencies, it is impossible to avoid the acoustic resonance phenomenon.

Whereas, for satisfying the above conditions the operation frequency must be remarkably lowered. This is not advantageous for miniaturizing the lighting circuit means.

On the other hand, it is known that if high-intensity discharge lamps are lighted at an operation frequency 10 times higher than the fundamental mode frequency of the acoustic resonance phenomenon, the problem of the acoustic resonance will be avoided. However, when the operation frequency raises so high, radiation noises and line noises become intense. When if it is countered by an electromagnetic shielding, there occurs another problem that the size of the high-intensity discharge lamp eventually increases.

SUMMARY OF THE INVENTION

It is an object of the present invention to miniaturize a high-intensity discharge lamp and/or its lighting circuit.

Another object of the present invention is to provide a compact high-intensity discharge lamp lighting device and a lighting system using the discharge lamp which is able to reduce a blackening due to an evaporation of an electrode material at a glow-arc transition.

Still another object of the present invention to provide a compact high-intensity discharge lamp lighting device and a lighting system using the discharge lamp which are able to not only avoid an acoustic resonance phenomenon, but also miniaturize the size.

According to a first aspect of the present invention, a high-intensity discharge lamp lighting device has a high-intensity discharge lamp containing a light-transmissive discharge enclosure having an envelope defining a discharge space and a hollow member having an inner diameter smaller than the envelope, an elongate electrode being inserted into the hollow member of the light-transmissive discharge enclosure leaving a narrow gap from the inner wall of the hollow member and having a leading end protruding into the hollow member of the light-transmissive discharge enclosure, a lead-conductor having a leading end coupled to an base end of the electrode, a middle portion attached to the light-transmissive discharge enclosure and a base end exposing outward from the light-transmissive discharge enclosure, and discharge agent including at least neon and argon and filled into the light-transmissive discharge enclosure, and lighting circuit means having a load characteristics continuous from a secondary open-circuit voltage to a secondary short-circuit current for lighting the high-intensity discharge lamp at a high-frequency.

In the following descriptions, some definitions and their technical meanings are presented for following specific terms, unless otherwise specified.

High-Intensity Discharge Lamp
<Light-transmissive Discharge Enclosure>

The light transparent discharge enclosure, which is provided with an envelope and a hollow member, could be made of silica glass or light transparent ceramics. Here, the term "light-transmissivity" means a transmissivity allowing a light generated by a discharge to pass through outside a discharge lamp enclosure. Accordingly the term may represent not only a transparency but also a light-diffusiveness. Further, it is sufficient that at least the enclosure may have a light-transmissivity, or the envelope may have a light-shading ability.

The enclosure mainly holds a positive column generated across the electrodes during lighting. Further, the enclosure allows several shapes such as a sphere-shape, an oval-shape, or a fusi-shape.

The envelope is defined on one or both of the enclosure and generates a narrow gap between its inner surface and an electrode by inserting the electrode inside of it.

In case of the light transparent discharge enclosure being made of silica glass, since the silica glass can be processed by heating it could be sealed by the sealing means such as a pinch sealant.

However, in the case of a discharge lamp light transparent ceramic enclosure, since it cannot be processed by heated it could be sealed by sealant using ceramic sealing compound.
<Electrode>

The electrode, which is elongated and is formed by a tungsten or doped tungsten, forms a narrow gap between the inner surface of the envelope by inserted into the envelope, and its top end protrudes inside of the hollow member.

The top end of the electrode could be wound by a coil of tungsten as occasionally needed in order to improve the discharge by enlarging the surface area.

The middle portion of the electrode is preferable to be a fixed size in order to form a narrow gap, i.e., a capillary as uniform as possible between the inner surface of the envelope of the discharge lamp light transparent enclosure with a space as equal as possible.

The base end of the electrode works for being fixed on a specific position to the discharge lamp light transparent enclosure and for leading the electric current from outside. In a case of a discharge lamp light-transmissive enclosure made of silica glass, the base end of the electrode is sintered to be connected electrically to the sealing metal film of the lead-conductor which is provided with sealing metal, and the top portion of it from the sintered portion could be held by the silica glass.

However, in a case of the discharge lamp light-transmissive enclosure made of the light-transmissive ceramic, the base end of the electrode is held electrically and mechanically by sintered to be fixed to the lead-conductor. Here, in order to buffer the heat at the sintering the material such as molybdenum could be interposed between the lead conductor and the base end of the electrode.
<Lead-conductor>

The lead-conductor works for applying a voltage across the electrodes, supplying the electric current to the electrode, and sealing the discharge lamp light-transmissive enclosure. The top end of the lead-conductor is connected to the base end of the electrode, and the base end is exposed to outside of the discharge lamp light-transmissive enclosure. Further the phrase "the base end is exposed to the outside of the discharge lamp light-transmissive enclosure" means that the may or may not protrudes outside of the discharge lamp light-transmissive enclosure, however, it has to face the outside while being supplied the current from outside.

Further the lead-conductor may be used for holding the whole high-intensity discharge lamp.

Furthermore, in case of the discharge lamp light-transmissive enclosure, the lead-conductor could be composed of sealing metal film and a lead-wire which top end is sintered with sealing metal.

In case of the discharge lamp light-transmissive made of the light-transmissive ceramic, the lead-conductor could be composed of the sealing metal rod, pipe, or coil of a niobium. In this case, since the niobium has an intense oxidation, an oxide-resistant conductor is connected to the lead-conductor and the lead-conductor has to be sealed by a sealant so as not to be exposed to the air when the high-intensity discharge lamp is turned on in a condition that it is exposed to the air.
<Discharge Agent>

The discharge agent contains at least neon and argon as starting gas and buffer gas, and it is filled in the discharge lamp light-transmissive enclosure to put more than 1 pressure at lighting.

Further, the discharge agent is able to use the metal halide or mercury as a light radiating substance or buffer gas as occasionally needed.

Among the neon and the argon, the argon is mixed with the neon at the ration of 0.1–10% in the percent pressure.

Further, the neon and the argon are generally used at a charged gas pressure in a range of 50–580 torr. Here, if the charged gas pressure is less than 50 torr, the glow-arc transition time becomes longer, and the blackening due to the evaporation of the tungsten constituting electrode becomes significant. On the other hand, if the charged gas pressure exceeds 580 torr, the operating voltage of the high-intensity discharge lamp rises, and the glow power increases, and thus the object of the present invention cannot be achieved.

In case of using the metal halogen for the discharge agent, as halogen for constituting the metal halide, it is able to use one or a plurality from an iodine, a bromine, a chlorine, and fluorine.

The halide of light radiating metal is able to be selected from a group of known metal halides, in order to achieve a radiation provided with a desired lighting characteristics about a light color an average color rendering evaluation index Ra and a lighting efficiency, and further in response to the size and the input power of the light-transmissive discharge enclosure. For instance, one or a plurality of halides selected from a group of Na-halide, Li-halide, Sc-halide or rare-earth metal-halide could be used.

Further, halide of metal having a relatively high vapor pressure and radiating fewer amounts of visible lights or not radiating the visible lights, such as aluminum can be filled in the discharge enclosure, in place of a proper amount of mercury as a buffer pressure.

Furthermore, in place of neon or argon, other rare gas could be filled in a discharge lamp enclosure, as occasionally needed.
<Other Structures>
(1) Outer Bulb In the high-intensity discharge lamp according to the present invention, the light-transmissive discharge enclosure could be configured to a type of lighting exposed to the air. However, the light-transmissive discharge enclosure could be accommodated in the outer bulb by sealed. The high-intensity discharge lamp could have a directive light emission by making the inner wall of the outer bulb as a reflection surface at a focal point of alight source of the high-intensity discharge lamp.
(2) Reflector The high-intensity discharge lamp according to the present invention is easy to collect light and advantageous in an optical configuration, since it could reduce the size of the light source. The light source could also be integrated with a reflector, as desired. In this case, the reflector could be formed on the inner wall of the outer bulb accommodating the high-intensity discharge lamp, or the high-intensity discharge lamp could be mounted on a separated reflector.

<Lighting Circuit Means>

The load characteristics of the lighting circuit means regulated in the present invention is the same as the load characteristics represented in the case of the fluorescent lamp lighting circuit means. And the present invention is based on the new knowledge that when the high-intensity discharge lamp with a construction mentioned above is lighted by the lighting circuit means with such a load characteristics mentioned above, it does not generate a blackening at the starting operation.

Accordingly, a fluorescent lamp lighting circuit means can be used for the present invention. Of course it is needless to say that it is able to use the lighting circuit means, which is manufactured, for the high-intensity discharge lamp to satisfy a predetermined load characteristics specified in the present invention.

In the present invention, the term "high-frequency" means a frequency of 5 kHz or higher.

Further, in the present invention, the secondary open-circuit voltage V20 of the lighting circuit means is set up within the rage having relatively large flexibility for the discharge starting voltage of the high-intensity discharge lamp. That is, the ratio V20/Vs of the secondary opening discharge voltage V20 of the lighting circuit means to the discharge starting voltage Vs of the high-intensity discharge lamp can be set up in the following range.

110<V20/Vs<800

Here, since the discharge starting voltage Vs of the high-intensity discharge lamp statistically varies, it has to pay much attention to specify the discharge starting voltage Vs.

By the way, the principal circuit arrangement of the lighting circuit means may be any type if it has the load characteristics as mentioned above. For instance, the lighting circuit means may have a circuit arrangement constituted by principally a half-bridge inverter, a full-bridge inverter, a parallel inverter, a single-transistor type inverter such as a blocking oscillator inverter.

<Operation of the Aspect of the Invention>

As a premise for effecting the blow-arc transition, the glow-arc discharge is needed to change from a usual glow discharge to an unusual glow discharge. A requirement for the glow-arc transition is not only a co-relation between the cathode voltage drop VK and the current density measured on electrode $j/p^2$ (here, j denotes a glow discharge current (mA); and p denotes and electrode surface area ($mm^2$)), but also varies in accordance with the kind of the buffer gas.

In the high-intensity discharge lamp lighting device according to this aspect of the present invention, the ionizing agent contains neon and argon as buffer gas. The electrode passes through the hollow member of the light-transmissive discharge enclosure. The lighting circuit means has a load characteristics similar to that of the fluorescent lamp lighting circuit means, i.e., a load characteristics continuous from the secondary open-circuit voltage to the secondary short-circuit wherein the secondary open-circuit voltage is close to the discharge starting voltage of the high-intensity discharge lamp. Thus, it is possible to lower the glow power at the glow-arc transition from a reason as described below.

(1) A current density measure on electrode decreases.

First, in the case that the buffer gas is comprised of both the neon and the argon, even though cathode voltage drops are the same, the glow current at the transition from the usual glow discharge to the unusual glow discharge decreases. So that, the glow power also decreases.

Further, at the glow discharge operation, since the mid-portion of the electrode which is exposed to the narrow gap of the envelope works as an electrode, like the edge portion of the electrode protruding to the hollow member of the discharge lamp light-transmissive enclosure, the effective surface of the electrode increases. Accordingly, even though the cathode voltage drop is fixed, the current density measured on the electrode is lowered.

(2) The discharge starting voltage is lowered.

In the case that the buffer gas is comprised of both the neon and the argon, since the discharge starting voltage is lowered as is already known in comparison to the case that only the argon is used as the buffer gas, it is able to lower the voltage which is supplied from the lighting circuit means at the glow-arc transition period, and thus the glow current is lowered. Here, the discharge starting voltage can be reduced to not greater than 2 kVp-p.

(3) The positive column loss increases.

If the buffer gas is comprised of both the neon and the argon, the positive column loss increases in comparison to the case that only the argon is used as the buffer gas, and thus a voltage is supplied to the electrodes.

As a result, the glow power is reduced to about ⅕ times in comparison to the case of argon only. It is found that the glow-arc transition time is extended for a moderate amount of time so that the evaporation of the tungsten on the electrode is depressed, and thus the blackening is remarkably reduced. Here, the glow-arc transition time can be nestled in a technically allowable range by optimizing the charged pressure of the buffer gas.

On one hand, since it forms a narrow gap between the inner surface of the envelope of the discharge lamp light-transmissive enclosure and the electrode, it is able to maintain a coldest portion of proper temperature at the interior portion of the narrow gap. Here, at the inner bottom of the narrow gap the non-evaporated discharge agent stays in a liquid-phase during the lighting of the lamp.

Accordingly, in the present invention, it is possible to obtain a compact high-intensity discharge lamp lighting device by using the compact lighting circuit means without using any igniter.

According to a second aspect of the present invention, a high-intensity discharge lamp lighting device has a high-intensity discharge lamp containing a light-transmissive discharge enclosure having an envelope defining a discharge space and a hollow member having an inner diameter smaller than the envelope, an elongate electrode being inserted into the hollow member of the light-transmissive discharge enclosure in leaving a narrow gap from the inner wall of the hollow member and having a leading end protruding into the hollow member of the light-transmissive discharge enclosure, a lead-conductor having a leading end coupled to a base end of the electrode, a middle portion attached to the light-transmissive discharge enclosure and a base end exposing outward from the light-transmissive discharge enclosure, and discharge agent including at least neon and argon and filled into the light-transmissive discharge enclosure, and lighting circuit means having load characteristics close to a discharge starting voltage of the high-intensity discharge lamp and continuous from a secondary open-circuit voltage to a secondary short-circuit current for lighting the high-intensity discharge lamp at a high-frequency.

In comparison to the first aspect of the invention, this second aspect of the invention is able to be configured so that the secondary open-circuit voltage of the lighting circuit means is close to the discharge starting voltage of the high-intensity discharge lamp, and the glow power at the starting operation time can be lowered.

The phrase "secondary open-circuit voltage is close to the discharge starting voltage" means that the secondary open-circuit voltage V20 is nestled in a range of 110–200% of the discharge starting voltage of the high-intensity discharge lamp.

In the case that the lamp power of the high-intensity discharge lamp is less than 50 W, the lighting circuit means is preferable to have a load characteristics in that the secondary opening discharge voltage V20 is less than 2.5 kVp-p, more preferably less than 2 kVp-p, and the secondary short-circuit current IS 1 s is less than 1.0 A.

According to a third aspect of the present invention, a high-intensity discharge lamp lighting device has a high-intensity discharge lamp containing a light-transmissive discharge enclosure having an envelope defining a discharge space and a hollow member having an inner diameter smaller than the envelope, an elongate electrode being inserted into the hollow member of the light-transmissive discharge enclosure leaving a narrow gap from the inner wall of the hollow member and having leading end protruding into the hollow member of the light-transmissive discharge enclosure, a lead-conductor having a leading end coupled to an base end of the electrode, a middle portion attached to the light-transmissive discharge enclosure and a base end exposing outward from the light-transmissive discharge enclosure, and discharge agent including at least neon and argon and filled into the light-transmissive discharge enclosure, and lighting circuit means having a high-frequency inverter provided with an LC resonator, for its key component:

As an inverter satisfying the requirements as mentioned above, it is able to be used a half-bridge inverter, a single-transistor type inverter, e.g., a blocking oscillator inverter, or a parallel inverter.

The oscillation control of the inverter may be done by either of a self-excitation or a separate-excitation. Furthermore, the operation frequency of the inverter may be made by either fixed or variable.

When the operation frequency of the inverter to the resonance frequency of the LC resonance circuit varies in accordance with a situation, the output voltage of the lighting circuit means can be controlled by changing the operation frequency of the inverter.

That is, if the operation frequency is brought closer to the resonance frequency of the LC resonance circuit at the starting operation, the output voltage rises, and thus the secondary open-circuit voltage can be brought closer to the discharge starting voltage of the high-intensity discharge lamp. On the other hand, if the operation frequency is brought away from the resonance frequency after lighting, the output voltage lowers. Accordingly, the secondary open-circuit voltage is able to be brought closer to the discharge starting voltage of the high-intensity discharge lamp, and the load characteristics of the lighting circuit means are able to smoothly extend from the secondary discharge voltage to the secondary short-circuit current.

And, when the operation frequency is fixed, it is able to control the output voltage of the lighting circuit means, by constituting the LC resonance circuit so as that its resonance frequency varies in response to a situation. That is, when the inductor L of the LC resonance circuit saturates at a no-load state and the inductance of the inductor L decreases under the saturation state, while the resonance frequency rises, so that the resonance frequency will be brought closer to the operation frequency. As a result, the output voltage of the lighting circuit means rises. Further, at a no-load state, the saturation state of the inductor L of the LC resonance circuit is released according to the lamp current, so that the resonance frequency alienates from the operation frequency and the output voltage lowers in accordance with the alienation.

In this invention, the circuit arrangement of the lighting circuit means is simplified, and thus it is possible to obtain the compact inexpensive high-intensity discharge lamp lighting device.

Further, since the lighting circuit means is provided with the LC resonance circuit, the waveform of the output voltage can be shaped to a sinusoidal waveform.

According to a fourth aspect of the present invention, the high-intensity discharge lamp of the high-intensity discharge lamp lighting device as defined in one of the above-described first through third aspects has, a light-transmissive ceramic discharge enclosure having an envelope defining a discharge space and a small diameter cylinder portion defining a hollow member having an inner diameter smaller than the envelope, an elongate electrode being inserted into the hollow member of the light-transmissive ceramic discharge enclosure in leaving a narrow gap from the inner wall of the hollow member and having leading end protruding into the hollow member of the light-transmissive ceramic discharge enclosure, a lead-conductor having a leading end coupled to a base end of the electrode for supporting the electrode and a base end exposing outward from the light-transmissive ceramic discharge enclosure, a sealing compound for sealing ceramics sealing the small diameter cylinder portion of the light-transmissive ceramic discharge lamp and the leading conductor together, and discharge agent including at least neon and argon and filled into the light-transmissive ceramic discharge enclosure.

<Discharge Lamp Light-transmissive Ceramic Enclosure>

The phrase "discharge lamp light light-transmissive ceramic enclosure" means a hermetic discharge lamp enclosure comprised of monocrystalline metal oxide, e.g., sapphire, polycrystalline metal oxide, e.g., semi-transparent aluminum oxide, and yttrium-aluminum garnet (YAG), yttrium oxide (YOX) and polycrystalline monoxide material, e.g., material having a light-transmissivity and heat-resistancy like aluminum nitride (AlN).

Further, in making the light-transmissive ceramic discharge enclosure, in case of the enclosure being sealed its two ends a centrally-located hollow member and a small diameter cylinder portion forming the envelope on the both end of the hollow member could be integrated together from the outset. However, it is also possible to produce an integrated light-transmissive ceramic discharge enclosure by separately pre-sintering individuals of a valve forming the enclosure and a pair of small diameter cylinders coupled to two opposite ends of the valve, then bonding them and lastly final-sintering the whole of them together. It is also possible to produce an integrated discharge enclosure by separately pre-sintering individuals of a cylinder forming a hollow member, a pair of end plates to be fit to both ends of the cylinder to close the cylinder and a pair of small diameter cylinders to be fit into central holes defined in the end plates to work as the small diameter cylinder portions, then assembling them together, and lastly final-sintering whole of them together.

In the case of a single closed-end structure, though the whole elements is able to be formed integrally from the outset in the same manner as the double closed-ends structure, individuals of a globe with an opening or a bottom-closed cylinder containing an opening and a cylinder for forming the small-diameter cylinder portion are provisionally sintered, and then fitting them desirably and lastly sintering whole of them to integrate. Further, the small-diameter cylinder portion could be made a single piece shared by a pair of electrodes, or alternatively it is also possible to prepare a pair of small-diameter cylinder portions. Here, when mounting the common piece small-diameter cylinder portion, upon an intermediate ceramic cylinder defined a pair of through-holes inserted into a small-diameter portion, and a pair of feed-conductors are inserted into the through-holes of the intermediate cylinder, and then sealed desirably, a required distance is ensured between the feed-conductor and the electrode.

Furthermore, in this aspect of the interior volume of the light-transmissive ceramic discharge enclosure is particularly effective at a small volume of less than 0.05 cc, or preferably less than 0.04 cc. But it is not necessarily limited to the specific volume. In this case the light-transmissive ceramic discharge enclosure has a whole length of 35 mm or less, preferably in a range of 10–30 mm.

<Lead Conductors>

A lead conductor could use niobium, a tantalum, a titanium, a zirconium, a hafnium and a vanadium which are an electric leading metals having almost the same average thermal expansion coefficient as that of the light-transmissive ceramic. In a case of using aluminum oxide such as alumina ceramic as the material of the light-transmissive ceramic discharge enclosure, since the niobium and the tantalum have almost the same average thermal expansion coefficient as that of the aluminum oxide, they are suitable for sealing. In case of using the yttrium oxide and the YAG, there is no significant difference in their thermal expansion coefficients. In case of using the aluminum nitride, it is preferable to use the zirconium as the material of the sealable portion.

<Sealant for Ceramic Sealing Compound>

The sealant for ceramic sealing compound is put between the lead-conductor and the small diameter cylinder portion at the end surface of the small diameter cylinder portion, and melts and enters into the gap between the small diameter cylinder portion and the lead-conductor. Then, the sealant for the ceramic sealing compound is cooled and hardened and seals the gap between the lead-conductor and the small diameter cylinder portion. The lead-conductor is fixed to a predetermined position by the sealant mentioned above.

The lead-conductor inserted in the small diameter cylinder portion is desirable to be sealed perfectly by the sealant mentioned above. Further, when the elongate base end portion of the electrode fixed to the lead-conductor is also covered by the sealant across the short distance more preferably across the extent of 0.2 to 0.3 mm, the lead-conductor is not easily eroded by discharge agent such as halogen.

<Operation of the Aspect of the Invention>

When the elongate base end portion of the electrode is fixed on the end of the lead conductor to form the ceramic sealing compound sealant between the lead conductor and the small-diameter cylinder portion of the light-transmissive ceramic discharge enclosure the light-transmissive ceramic discharge enclosure is sealed and also a bottom sealed by the sealant is formed at the end of the envelope formed by the small-diameter cylinder portion, so as to form a narrow gap between the inner surface of the envelope and the electrode which is inserted into the small-diameter cylinder portion.

Since it uses the light-transmissive ceramic for the light-transmissive discharge enclosure, it is able to obtain the high-intensity discharge lamp lighting device provided with the high-intensity discharge lamp of high lamp efficiency and long life.

Further, the light-transmissive ceramic discharge enclosure does not transmit neon the neon is hard to disappear at long time lighting so as to work well in long time.

According to a fifth aspect of the present invention, the high-intensity discharge lamp of the high-intensity discharge lamp lighting device as defined in one of the above-described first through fourth aspects is characterized in that the high-intensity discharge lamp is charged with the discharge agent containing the neon and the argon with a gas pressure in a range of 100–200 torr.

The present invention limits a preferable charged gas pressure of the neon and the argon of the high-intensity discharge lamp.

That is, the glow-arc transition time and the extent of the blackening vary in accordance with starting gas and a charged pressure of the buffer gas. The more the charged gas pressure increases, the more the glow power increases, and the more the heating temperature of the electrode rises. As a result, the glow-arc transition time tends to be shorted.

On the other hand, if the charged gas pressure of the neon and the argon become excessive the blackening increases. While if the charged gas pressure decreases the evaporation of the electrode substance increases due to the increasing of the glow-arc transition time.

Accordingly, by limiting the charged gas pressure of the neon and the argon in the range as mentioned above, the glow-arc transition time will be in a range of 2–3 sec, and also the blackening is remarkably reduced. The glow-arc transition time in such a case resides in a tolerance in practical application.

According to a sixth aspect of the present invention, a high-intensity discharge lamp lighting device has a discharge lamp containing an envelope defining a discharge space, a light-transmissive ceramic discharge enclosure having a small diameter cylinder portion coupled to the envelope and an inner diameter smaller than the envelope, an elongate electrode being inserted into the small diameter cylinder portion leaving a narrow gap from the inner wall of the small diameter cylinder portion of the light-transmissive ceramic discharge enclosure, and discharge agent filled into the light-transmissive ceramic discharge enclosure, and lighting circuit means for lighting the high-intensity discharge lamp at a high-frequency, wherein a glow-arc transition time of the high-intensity discharge lamp is in a range of 0.5–3.0 sec.

The explanations about the light-transmissive ceramic discharge enclosure, the electrode, the feed-conductor and the lighting circuit means are eliminated since they are identical to those in the preceding aspects of the present invention.

<Discharge Agent>

The discharge agent contains at least neon and argon as buffer gas, and it is filled in the discharge lamp light-transmissive ceramic enclosure to put more than 1 pressure at lighting, similar to the preceding embodiments. Further, the discharge agent is also able to use the metal halide or mercury as a light radiating substance or buffer gas, in similar to the preceding embodiments. The discharge agent is able to use the metal halide or mercury as a light radiating substance or buffer gas as occasionally needed. Further as the rare gas, a combination of neon and argon can be filled for reducing a glow current at a transition from a diameter cylinder portion coupled to the envelope and an inner diameter smaller than the envelope, an elongate electrode being inserted into the small diameter cylinder portion in leaving a narrow gap from the inner wall of the small diameter cylinder portion of the light-transmissive ceramic discharge enclosure, and discharge agent filled into the light-transmissive ceramic discharge enclosure, and lighting circuit means for lighting the high-intensity discharge lamp at a high-frequency, wherein a glow-arc transition time of the high-intensity discharge lamp is in a range of 0.5–3.0 sec. The explanations about the light-transmissive ceramic discharge enclosure, the electrode, the feed-conductor and the lighting circuit means are eliminated since they are identical as those in the preceding aspects of the present invention.

<Discharge Agent>

The discharge agent contains at least neon and argon as buffer gas, and it is filled in the discharge lamp light-transmissive ceramic enclosure to put more than 1 pressure at lighting, in similar to the preceding embodiments. Further, the discharge agent is also able to use the metal halide or mercury as a light radiating substance or buffer gas, in similar to the preceding embodiments. The discharge agent is able to use the metal halide or mercury as a light radiating substance or buffer gas as occasion needed. Further as the rare gas, a combination of neon and argon can be filled for reducing a glow current at a transition from a normal glow discharge to an abnormal glow discharge, and for reducing the discharge starting voltage, i.e., for adjusting the glow-arc transition time. Further in this case, the argon is mixed with the neon at the ration of 0.1–10% in the percent pressure. Furthermore, the neon and the argon are generally used at a charged gas pressure in a range of 50–580 torr, preferably in a range of 100–200 torr. Here, if the charged gas pressure is less than 50 torr, the glow-arc transition time becomes longer, and the blackening due to the evaporation of the tungsten constituting electrode becomes significant. On the other had, if the charged gas pressure exceeds 580 torr, the operating voltage of the high-intensity discharge lamp rises, and the glow power increases.

<Glow-Arc Transition Time>

In this aspect of the invention, the glow-arc transition time must be in a range of 0.5–3 sec. This glow-arc transition time is obtained by an average of five samples of measurements and each lowering point of lamp voltage waveform is counted by monitoring on an oscilloscope. Here the lowering point of lamp voltage waveform must be a lowering point when both electrodes carry out the glow-arc transition. Accordingly, when there is a time difference between the glow-arc transitions on the electrodes, a lowering point of the later occurrence of the glow-arc transition is effective.

By the way if the glow-arc transition time is less than 0,5 sec, a large amount of the glow-arc transition power time is supplied within a short time of period so as to cause an excessive heating of the electrode. Then the electrode is excessively evaporated. Therefore, improper blackening occurs at the starting time is accelerated, and the luminous flux retention lower too much.

If the glow-arc transition time becomes so long as to exceed 3.0 sec, the spattering of the electrode material becomes prominent.

So that, there improperly occurs that the blackening at the starting time is accelerated, and the luminous flux retention lowers.

If the glow-arc transition time is in a range of 0.6–3.0 sec, it is possible to ensure a luminous flux retention of 80% or more after the lighting time of 3,000 hrs. Here the lighting time means the time period for a cycle of 166 min of lighting and 16 min of delighting. Further, it is able to define the glow-arc transition time into the above range by properly setting the requirements of the high-intensity discharge lamp and/or its matching to the lighting circuit means.

<Operation of the Aspect of the Invention>

In this aspect of the invention, as the glow-arc transition time of the high-intensity discharge lamp provided with the light-transmissive ceramic discharge enclosure is set to be in a prescribed range, a blackening at the starting time is reduced and thus a luminous flux retention can be raised.

Further, if the glow-arc transition time is less than 3 sec, the glow-arc transition time in such extent resides in an agreeable allowable range in practical application not making users fill discomfort.

According to a tenth aspect of the present invention, the high-intensity discharge lamp of the high-intensity discharge lamp lighting device as defined in one of the above-described first through ninth aspects is characterized by the fact that the high-intensity discharge lamp has a lamp power lower than 60 W.

Since the high-intensity discharge lamp is so compact, the present invention is suitable for the optical fibers and it limits the high-intensity discharge lamp lighting device which could be used in place of the halogen electric bulb by the lamp power.

Such a compact high-intensity discharge lamp could be more preferable if it has a following requirements. It is preferable if it satisfies whole requirements, however it allows one or some combinations of them.

(1) The relation between the diameter øs (mm) of the lead conductor and the diameter øs (mm) of the electrode makes the relation to satisfy the following formula.

$$0.2 < \o e/\o s < 0.6$$

In order to prevent the corrosion of the sealant by the halides by decreasing the temperature of the sealant of the ceramic sealing compound, and improve the lighting efficiency by increasing the temperature of the narrow gap, the heat resistance is decreased by thickening the lead conductor on one hand, and increasing the heat resistance of the electrode on the other hand. If the diameter ratio øe/øs is lower than 0.2 the electrode is much thinner. While if it is higher than 0.6, the temperature of the sealant and the narrow gap can not be maintained at a specific value.

(2) Relationship between the interior volume of the light-transmissive ceramic discharge enclosure and its linear transmittance; the interior volume of the light-transmissive ceramic discharge enclosure is set lees than 0.1 cc, or preferably lees than 0.05 cc, the average linear transmittance of the hollow member is set to 20° r6 or more, and preferably to 30% or more.

It is assumed that the linear transmittance is measured in a wavelength of 550 nm. Here, the term "average linear transmittance" means an average value of the linear transmittance data measured at five different sampling points.

In the case of the light-transmissive ceramic discharge enclosure having small interior volume as mentioned above, if the average linear transmittance of its hallow portion is 20% or more, it is able to enhance not only the optical efficiency (overall apparatus optical efficiency) including that of an optical system such as a reflector to be combined with the discharge lamp, but also to reduce occurrences of the cracks in the light-transmissive ceramic discharge enclosure.

Here, the interior volume of the light-transmissive ceramic discharge enclosure is measured is a following way. First, the enclosure is submerged in water to fill the water in the enclosure. Then the enclosure is drawn out from water after the openings of both the small diameter cylinder portions having been closed. Then the volume of the water in the enclosure is metered and measured.

(3) The overall length of the light-transmissive ceramic discharge enclosure; the overall length is made lees than 30 mm.

(4) Narrow gap the narrow gap is set less than 0.21 mm.

In order to obtain the high-intensity discharge lamp of compact lamp power lower than 60 w, long life and high lamp efficiency, it is found that it is unable to obtain a favorable discharge lamp even if the size of the conventional discharge lamp had been proportionally reduced.

So, by setting the narrow gap as mentioned above, the heat resistance of the electrode is increased, and the heat transmittance from the discharge plasma or the electrode is decreased, so as to decrease the temperature of the sealant. Thus, it does not cause a leak at the sealant.

According to an eleventh aspect of the present invention, a high-intensity discharge lamp lighting device has a high-intensity discharge lamp having a light-transmissive ceramic enclosure with a spherical envelope at a sphericity of 0.6 or more for defining a discharge apace, a pair of electrodes located in facing to an interior of the light-transmissive ceramic enclosure, and discharge agent including neon and argon and filled into the light-transmissive ceramic discharge enclosure, and lighting circuit means for lighting the high-intensity discharge lamp at an operating frequency in a range of 40–80 kHz.

High-Intensity Discharge Lamp

<Light-transmissive Ceramic Discharge Enclosure>

The light-transmissive ceramic discharge enclosure is distinctive in its enclosure being shaped spherically with a sphericity of 0.6 or more. The sphericity will be described in referenced to FIG. 2.

FIG. 2 is a drawing for explaining the sphericity of the enclosure of the light-transmissive ceramic discharge enclosure in the high-intensity discharge lamp according to the present invention.

In FIG. 2, 1 denotes a light-transmissive ceramic enclosure: 1a denotes an enclosure; 1b denotes a small diameter portion x denotes a central axis and y denotes an axis vertical to the central axis x.

The light-transmissive ceramic enclosure 1 is made of a 1 is light-transmissive ceramics, and having an overall length L.

The envelope 1a is located at a center of the light-transmissive ceramic enclosure 1 and shaped spherically at a prescribed sphericity R,B. The envelope 1a has a maximum inside diameter a, a maximum outside diameter Oa, and an axial length b along the central axis x.

The small diameter cylinder portions 1b are protruded integrally from the ends of the envelope 1a along the central axis x. The small diameter cylinder portions 1b are defined with through-holes 1b1 with lengths L1, L2, respectively along the central axis x. Further the through-holes 1b1 have inner ends communicating with the interior of the envelope 1a and outer ends communicating with the exterior.

Further electrodes as described later are inserted into the through-holes 1b1 of the small diameter cylinder portions 1b, thus narrow gap or so-called capillaries are defined between the inner wall of the small diameter cylinder portions 1b and the electrodes. The small diameter cylinder portions 1b are also used for sealing the light-transmissive ceramic enclosure 1.

Here, the sum of the respective lengths L1 and L2 of the small diameter cylinder portions 1b, i.e., L1+L2 equals to a subtraction of the axial length b1 of the envelope 1a from the overall length L of the light-transmissive ceramic enclosure 1.

Here, P1 denotes two intersections of the axis y sad the inner wall of the enclosure 1a; P2 denotes surfaces on the boundaries of the inner wall of the enclosure 1a and the small diameter cylinder portions 1b whereon lines 1 from the intersections P1 normally contact. Further, P3 denotes intersections of the lines 1 sad the central axis x. Then the axial length b of the enclosure In is given as the distance between both of the intersections P3.

Then a sphericity RB of the enclosure 1a is given by a following equation.

$$RB = a/b$$

Here a denotes a maximum interior diameter of the enclosure 1a, and b is the axial length of the enclosure 1.

The sphericity RB is brought closer to 1, when the boundaries of the of the inner wall of the enclosure 1a of the light-transmissive ceramic enclosure 1 and the small diameter cylinder portions 1b, i.e., the surfaces P2 are square-cornered, and the interior diameters of the through-holes 1b1 of the small diameter cylinder portions 1b are relatively small, and further the enclosure 1a is a perfect sphere. However, the sphericity RB varies with the curvature radius of the surfaces P2 and the interior diameters of the small diameter cylinder portions 1b, from its definition. Here, the curvature radius of the surfaces P2 varies under conditions of manufacturing methods of the light-transmissive ceramic discharge enclosure. The interior diameters of the through-holes 1b1 of the small diameter cylinder portions 1b are also influenced by a lamp design for the diameter of the electrode and the narrow gap. However, se they hardly influence on the resonance frequency, the sphericity RB in the present invention is defined as mentioned above in consideration of some degree of design flexibility. Further, although the shape of the envelope of the light-transmissive ceramic enclosure in the present invention is somewhat oblong in similar a spheroid, the shape can be considered as a sphere.

Further, if the sphericity RB exceeds 1, there is a range considered as a share oblong along the axis y than the axis x. Accordingly, the sphericity RB can be allowed to extent till generally about 1.2, but preferably 1.1

The structure of the light-transmissive ceramic enclosure is not specifically limited except the structure of the envelope.

<Other Structures>

The explanations about the electrode, the discharge agent and the lamp power are eliminated since they are identical se those in the preceding aspects of the present invention.

<Lighting Circuit Means>

Lighting circuit means generates an operation frequency in a range of 40–80 kHz for lighting high-intensity discharge lamps. As the operation frequency is irrelevant to a circuit arrangement, any type of circuit arrangement can be used for the lighting circuit means.

<Operation of the Aspect of the Invention>

According to this aspect of the invention, the sphericity of the envelope of the light-transmissive ceramic enclosure has a sphere with the sphericity of 0.6 or more. The discharge agent includes neon and argon. The lamp power is lees than 50 W. And the operation frequency of the lighting circuit means is in a range of 40–80 kHz. Here as the resonance frequency of the high-intensity discharge lamp becomes sufficiently higher than the operation frequency, there is no acoustic resonance. Further as the operation frequency is in the above-described range, circuit components, in particular, windings are reduced in their size. Thus the operation frequency in the above-described range is effective to miniaturize the lighting circuit means. Further semiconductor switching elements used in the lighting circuit means for generating a high-frequency could be reduced in their cost, and able to obtain a high-frequency conversion efficiency due to a small switching loss.

According to a 12th aspect of the invention, in the high-intensity discharge lamp of the high-intensity discharge lamp lighting device as defined in the 11th aspect of the invention, it is characterized by that a glow-arc transition time of the high-intensity discharge lamp is in a range of 0.6–8.0 sec.

According to the glow-arc transition time in the above range, this aspect of the invention can provide a high-intensity discharge lamp which hardly cause such a blackening at the starting operation if a compact lighting circuit means like that used for fluorescent lamp is used for the lighting operation.

According to a 13th aspect of the invention, in the high-intensity discharge lamp of the high-intensity discharge lamp lighting device as defined in any one of the first, second, fourth, fifth to 12th aspects of the invention, it is characterized by that the lighting circuit means includes an LC resonance type high-frequency inverter.

According to this aspect of the invention, the lighting circuit means is able to generate a required starting voltage at a starting operation by a simple circuit arrangement. Further explanations of this aspect of the invention are eliminated since they are identical as those in the third aspect of the present invention. According to a 14th aspect of the invention, in the high-intensity discharge lamp of the high-intensity discharge lamp lighting device as defined in any one of the first to 13th aspects of the invention, it is characterized by that the lighting circuit means has a secondary no-load voltage in a range of 1.0–3.0 kVpp.

According to this aspect of the invention, the lighting circuit means with the secondary no-load voltage in that range is able to reliably start the high-intensity discharge lamp without an igniter.

Further as the secondary no-load voltage in that range the lighting circuit means is simplified its construction. For example, an LC resonant type high-frequency inverter is able to be used for easily obtaining a required secondary no-load voltage.

According to a 15th aspect of the invention, a lighting device is characterized by that it is comprised of a lighting system main body and a high-intensity discharge lamp as defined in any one of the first to 14th aspects of the invention.

In this aspect of the invention, the term "lighting device" a wide concept containing all of such devices using lights radiated by high-intensity discharge lamps for any purpose. For example, the lighting device according to this aspect of invention is able to apply for bulb-type high-intensity discharge lamps, lighting equipments, mobile-use headlights, optical fiber-use light sources, image projectors, photochemical devices, fingerprint discriminators, etc.

Here, the term "lighting device main body" means reminders of the lighting device from which the high-intensity discharge lamp is removed.

Here, also the term "bulb-type high-intensity discharge lamp" means a lighting device in which a high-intensity discharge lamp and a stabilizer thereof are integrated together, and a bulb-base is added thereto for receiving a commercial power. By loading the bulb-base to a corresponding lamp socket, this type of lamp device is used as if it is a incandescent lamp.

Further in case of constructing the bulb-type high-intensity discharge lamp, it is able to provide a reflector for obtaining a required light distribution from the high-intensity discharge lamp.

Furthermore, it is able to provide a light diffusion glove, or a cover for moderately reducing the brightness of the high-intensity discharge lamp.

Further, it is able to use a bulb-base having a desirable requirement. Accordingly, for replacing directly with conventional light lamps, a bulb-base the same as that of the conventional light lamps is able to be adopted.

Further, in the case of the lighting equipment, the lighting equipment can be a high-intensity discharge lamp provided with a lighting circuit means or a high-intensity discharge lamp provided with a bulb-type high-intensity discharge lamp not having a lighting circuit means. Further in the case of the lighting equipment provided with a lighting circuit means, the lighting circuit means can be located in the lighting equipment or as exterior, e.g., in ceilings.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 11 is a front view showing a high-intensity discharge lamp for use with a third embodiment of the high-intensity discharge lamp lighting circuit according to the present invention;

FIG. 12 is a sectional view showing the high-intensity discharge lamp as shown in FIG. 11, in which only its top end is sealed;

DESCRIPTION OF THE PREFERRED EMBODIMENTS

Referring now to attached drawings FIGS. 3 through 20, some preferred embodiments of the present invention will be explained hereinafter.

Figure 3:
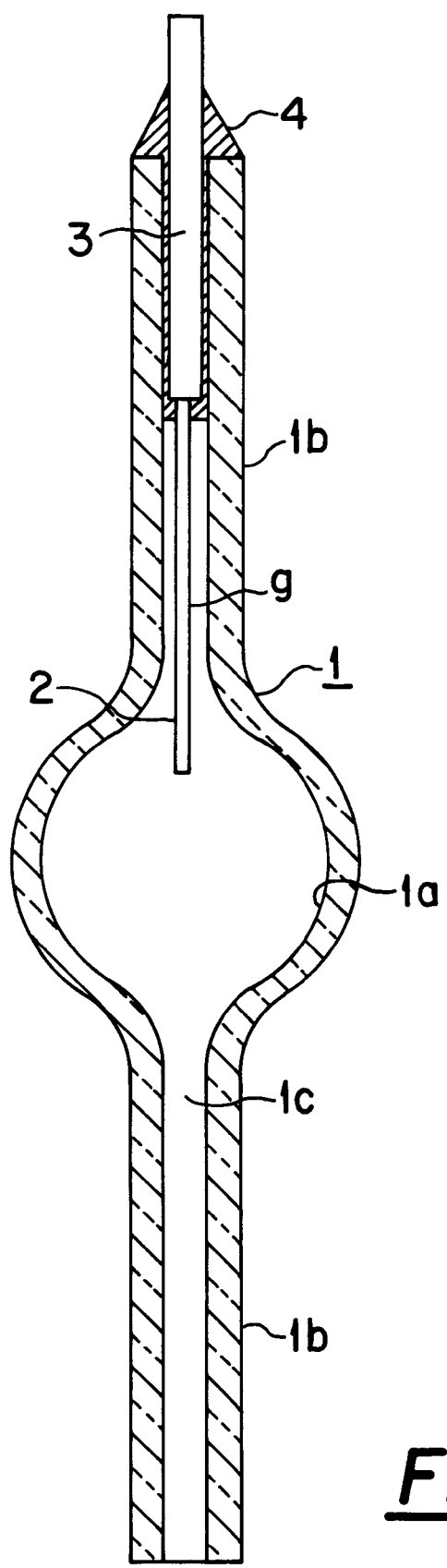
FIG. 3 is a partial front section of a first embodiment of the high-intensity discharge lamp lighting device according to the present invention.

FIG. 3 is a partial front section of the high-intensity discharge lamp in a first embodiment of the high-intensity discharge lamp according to the present invention.

In FIG. 3, 1 denotes a light-transmissive ceramic discharge enclosure; 2 denotes an electrode 3 denotes s lead conductor 4 denotes a sealant, and all of them take symmetry in top and bottom. An electrode 2, a lead conductor 3, and a sealant 4 at the bottom aide are not shown in FIG. 3.

The light-transmissive ceramic discharge enclosure 1 is provided with a hollow member 1a, a small diameter cylinder portions 1b, 1b, and an envelopes 1c, 1c.

The hollow member 1a is almost oval and both ends are shrunk by smooth curved surfaces.

The small diameter cylinder portion 1b is coupled to the hollow member 1a by a smooth curved surface, so as to integrally form the light-transmissive ceramic discharge enclosure 1.

The envelope 1c is formed inside of the small diameter cylinder portion 1b.

The electrode 2 is made of a doped tungsten rode. The tip end is protruded in the hollow member 1a and inserted into the envelope 1c. And the narrow gap g is formed between the envelope 1c and the electrode 2.

The lead conductor 3 is made of a niobium rod. Its tip end in welded to the base end of the electrode 2, and the base end protrudes to the outer portion of the light-transmissive ceramic discharge enclosure 1.

The ceramic sealing compound is melted then hardened so that the sealant 4 enters into the gap between the small diameter cylinder portion 1b of the light-transmissive ceramic discharge enclosure 1 and the sealing portion 2 in order to seal the light-transmissive ceramic discharge enclosure 1, and at the same time the lead conductor 3 covers inside of the light-transmissive ceramic discharge enclosure 1 so as not to be exposed. And by the sealing the electrode 2 is fixed on a specific position.

To form the sealant 3, a ceramic sealing compound is located around the lead conductor 3 protruding outside of the small diameter cylinder portion so that it is melted by heat and entered into the gap between the lead conductor 3 sad the inner surface of the envelope 1c so as to cover the whole lead conductor 3 which is inserted into the small diameter cylinder portion 1b and the base end portion of the electrode 2, then it undergoes cooling to be hardened.

By the way, in the light-transmissive ceramic discharge enclosure 1 discharge agent containing buffer gas that includes neon and argon and halide of light radiating metal are filled.

EXAMPLE 1

The high-intensity discharge lamp as shown in FIG. 3 has following requirements.

Light-transmissive ceramic discharge enclosure: made of YAG: 25 mm in overall length Hollow portion 1a: 5 mm is outer diameter; 4.6 mm in inner diameter; 0.5 mm in thickness Small diameter cylinder portion 1b: 1.8 mm in outer diameter; 0.75 mm in inner diameter; 0.53 mm in thickness Electrode: 0.25 mm in diameter; 3 mm in inter-electrode distance Lead conductor: made of niobium 0.64 mm in diameter Narrow gap g: 0.25 mm Discharge agent: Ne 3%+Ar 500 torr in starting gas and buffer gas and proper quantity of mercury and halogen Lamp power: 20 w FIG. 4 is a graph illustrating a relationship between a current density measured on electrode and a discharge starting voltage of a first embodiment of the high-intensity discharge lamp device according to the present invention and a comparative example.

Figure 4:
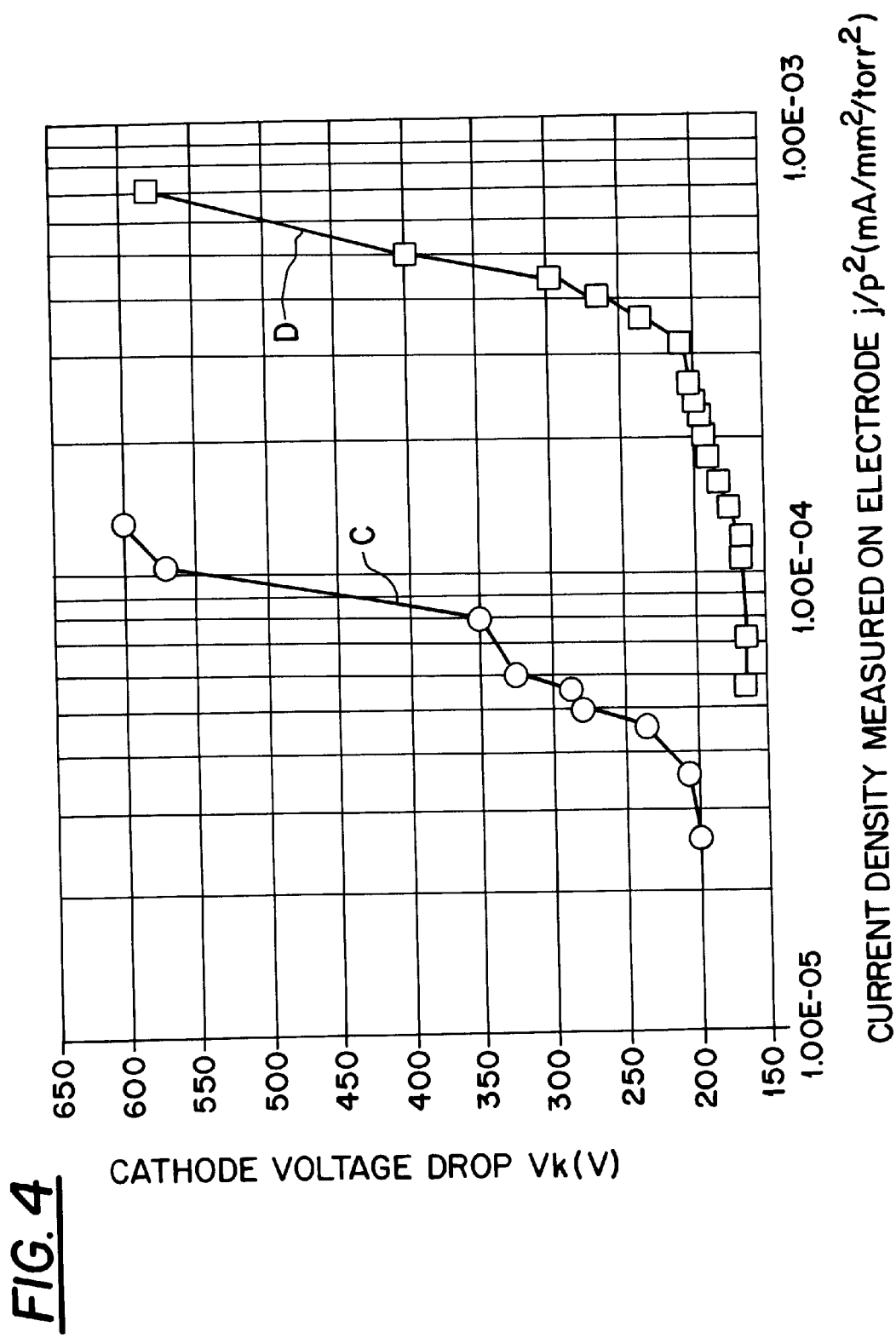
FIG. 4 is a graph illustrating a relationship between a current density measured on electrode and a discharge starting voltage of a first embodiment of the high-intensity discharge lamp device according to the present invention and a comparative example.

In FIG. 4, the horizontal axis shows a current density measured on electrode $j/p^2$ ($mA/mm^2/torr^2$), and the vertical axis shows a cathode voltage drop Vk (V). The characteristic curve C is the present embodiment, and the characteristic curve D is the comparative example. Here, the comparative example is almost the same as the present embodiment, except that the buffer gas is comprised of only the argon.

As seen from the graph of FIG. H, when the starting gas and the buffer gas are a mixture of neon and argon, the current density measured on electrode decreases and the glow power decreases.

Figure 5:
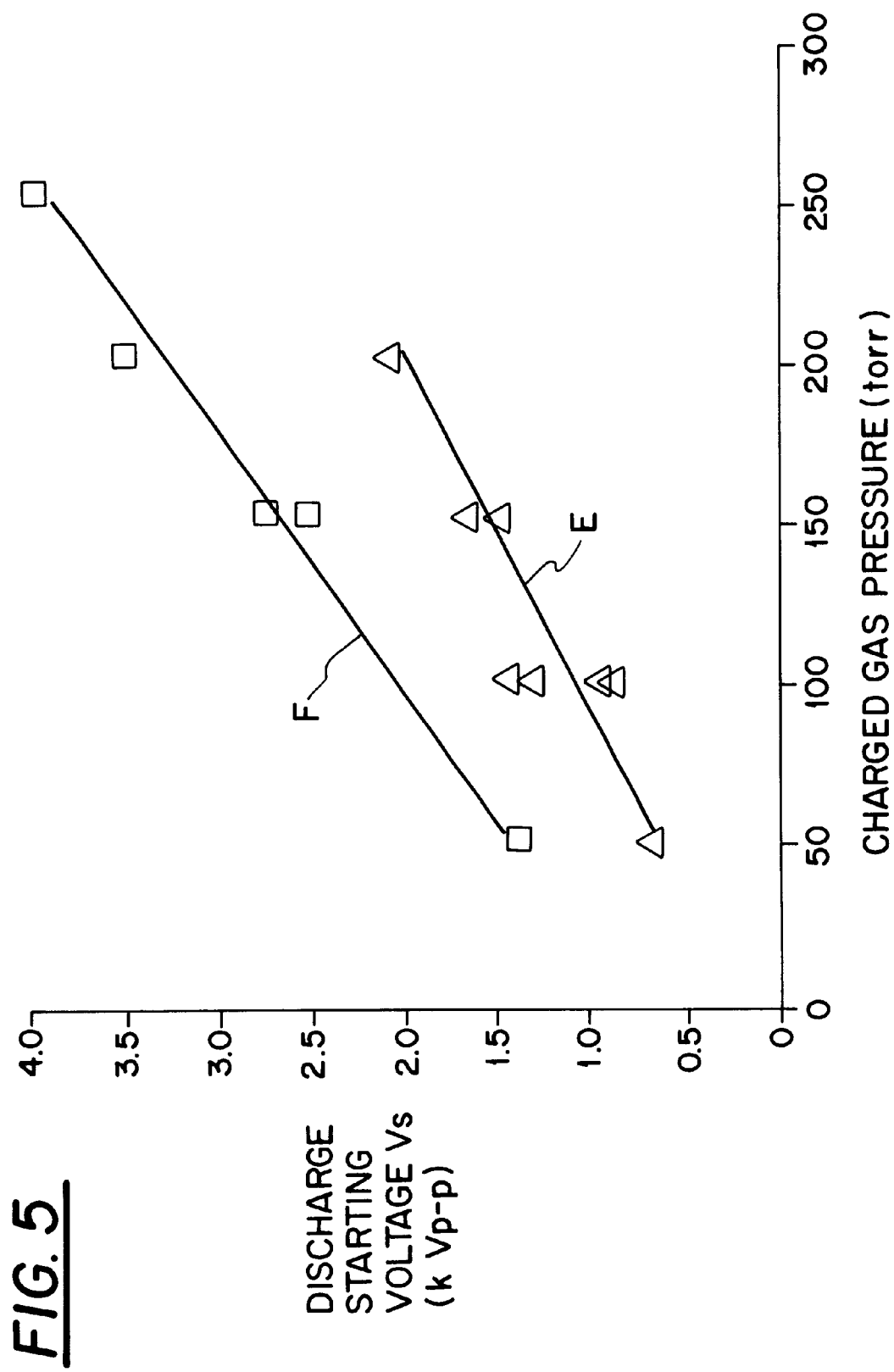
FIG. 5 is a graph showing a relationship between a charged gas pressure and a discharge starting voltage of the first embodiment of the high-intensity discharge lamp device according to the present invention and a comparative example.

FIG. 5 is a graph showing a relationship between an charged gas pressure and a discharge starting voltage of the first embodiment of the high-intensity discharge lamp device according to the present invention sad a comparative example.

In FIG. 5, the vertical axis shows the charged gas pressure (torr), and the horizontal axis shows the discharge starting voltage Vs (V). The characteristic curve E is the present embodiment, and the characteristic curve F is the comparative example.

Here, the comparative example is the identical to the comparative example shown in FIG. 4.

As seen from the graph of FIG. 4, when the starting gas and the buffer gas are comprised of a mixture of neon and argon, the discharge starting voltage decreases lower than that in the buffer gas comprised of only the argon.

Figure 6:
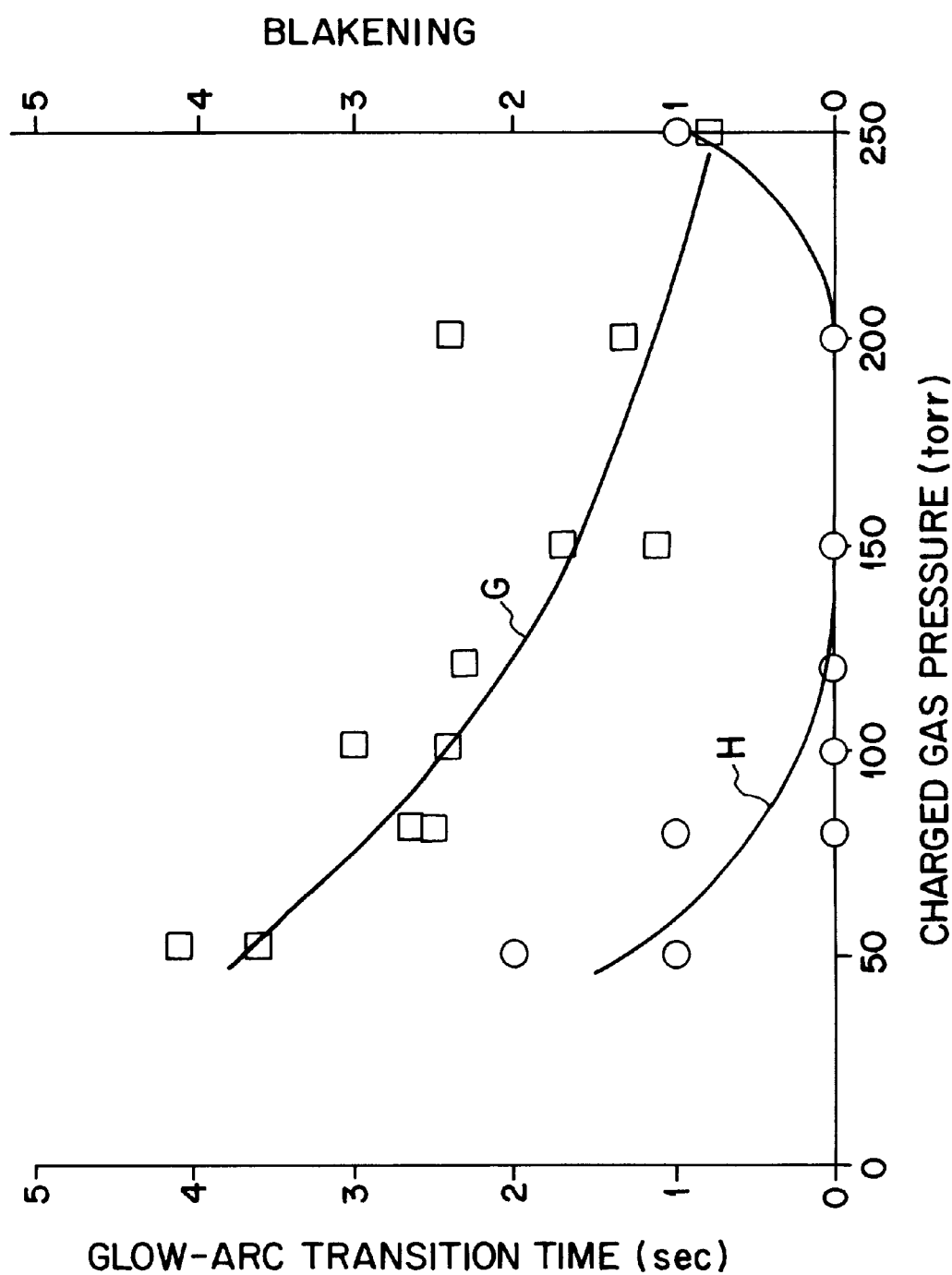
FIG. 6 is a graph showing the relation among a charged gas pressure, a glow-arc transition time and a blackening degree of the high-intensity discharge lamp of the first embodiment in the high-intensity discharge lamp lighting circuit according to the present invention.

FIG. 6 is a graph showing the relation among a charged gas pressure, a glow-arc transition time and a blackening degree of the high-intensity discharge lamp of the first embodiment in the high-intensity discharge lamp lighting device according to the present invention.

In FIG. 6, the vertical axis shows the charged gas pressure (torr). While the left of the vertical axis shows the glow-arc transition time (sec), and the right of the vertical axis shows a blackening level. The characteristic curve G show the glow-arc transition time, sad the characteristic curve H shows the degree of blackening. Here, the degree of blackening is obtained by a luminosity evaluation, and the higher the value is, the heavier the blackening is.

The graph of FIG. 6 is plotted by measuring the glow-arc transition time and the blackening degree of the high-intensity discharge lamp in which charged gas pressure varies when the starting gas and the buffer gas are comprised of a mixture of aeon and argon.

As seen from the graph of FIG. 6, the charged gas pressure is optimal in a range of 100–200 torr.

Figure 7:
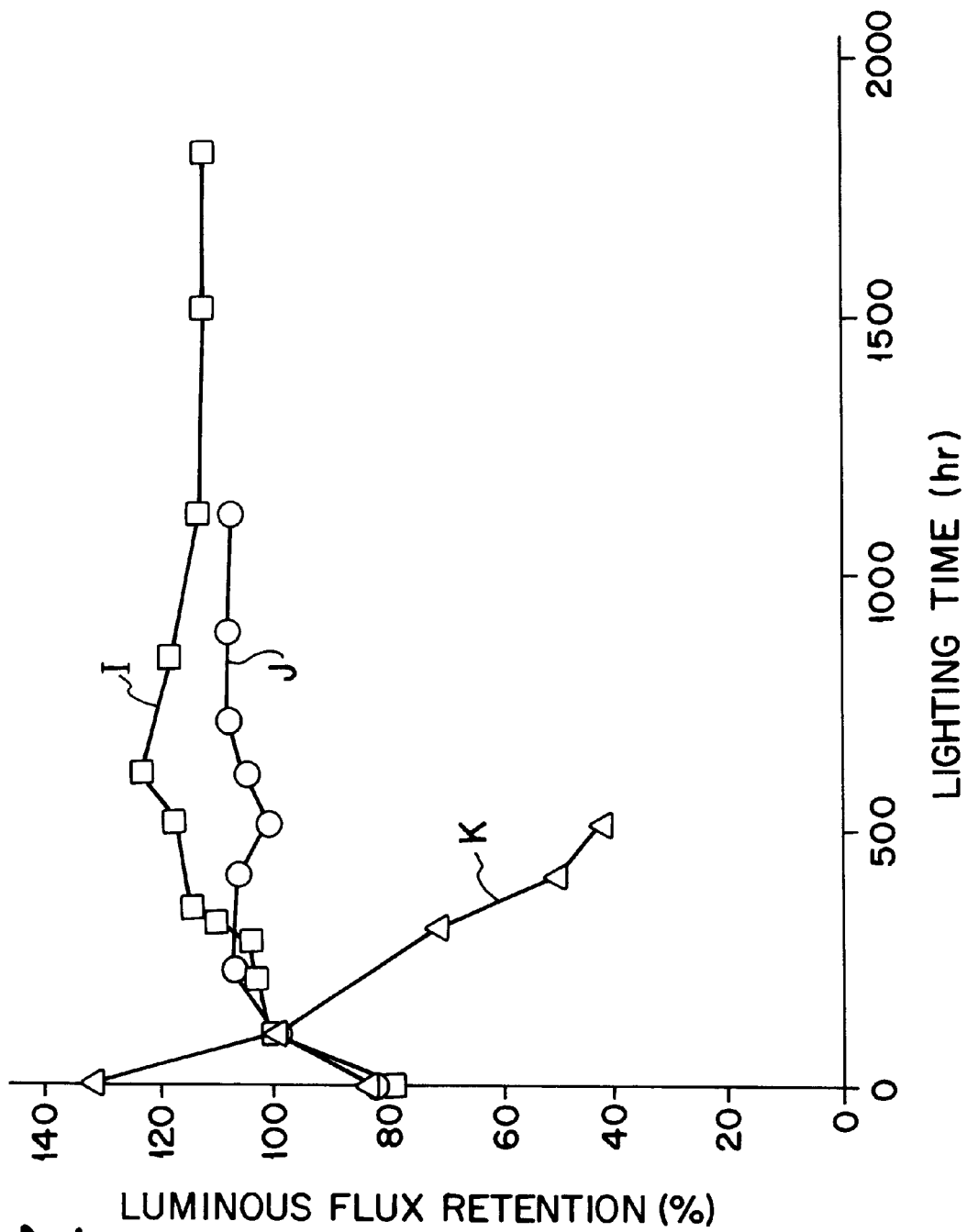
FIG. 7 is s graph showing characteristics of a luminous flux retention to a different charged gas pressure of the first embodiment of the high-intensity discharge lamp device according to the present invention and a comparative example.

FIG. 7 is a graph showing characteristics of a luminous flue retention to a lighting time of the first embodiment of the high-intensity discharge lamp device according to the present invention and a comparative example.

In FIG. 7, the vertical axis shows a lighting time (hr), and the horizontal axis shows a luminous flux retention ratio (%).

The characteristic curve I is a luminous flux retention ratio characteristics of an example containing 100 torr of a mixture of neon and argon. The characteristic curve J is a luminous flux retention ratio characteristics of another example containing 160 torr of the mixture. And the characteristic curve K is of a luminous flux retention ratio characteristics of the comparative example containing 100 torr of the argon.

As seen from the graph of FIG. 7, a favorable luminous flux retention ratio characteristics is practical application is obtained by the present invention.

Figure 8:
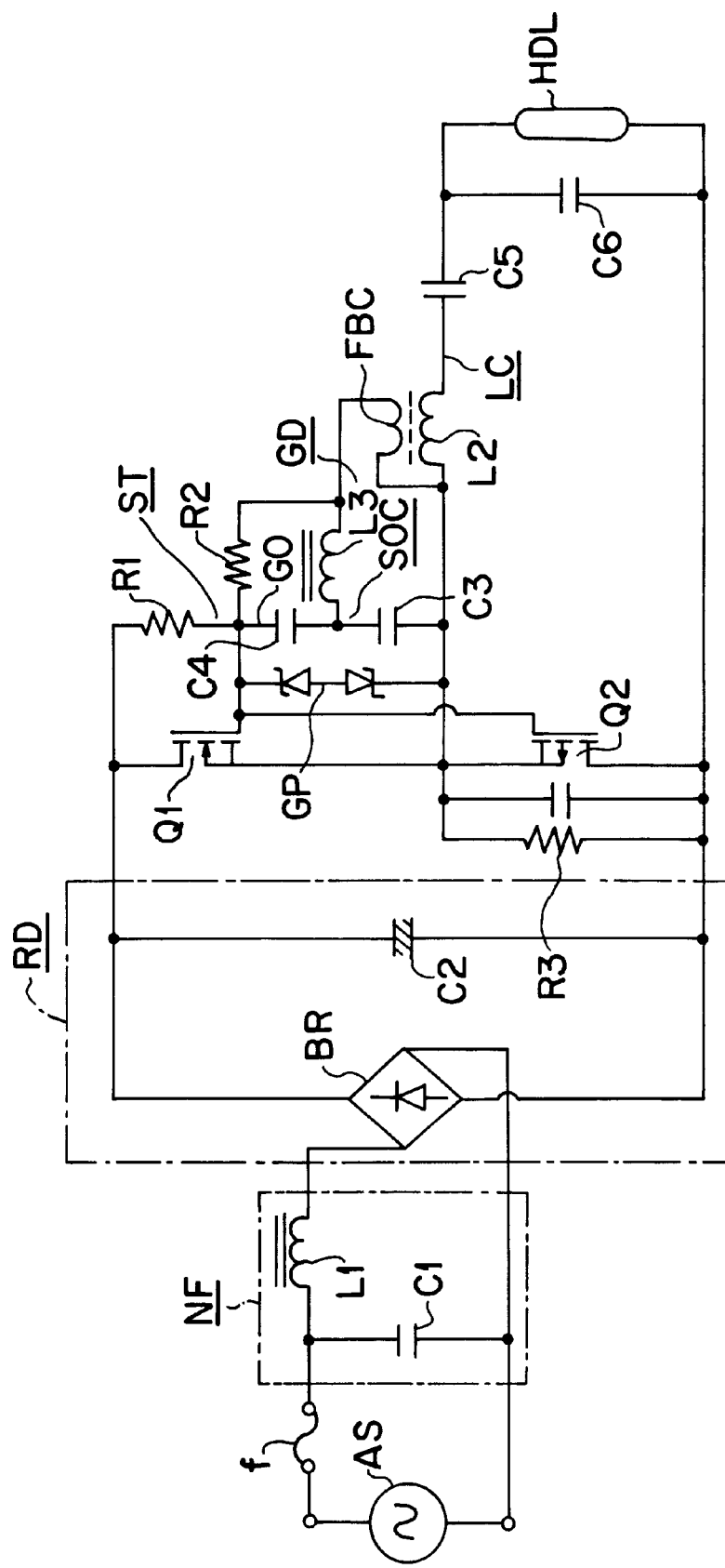
FIG. 8 is a circuit diagram of a lighting circuit means in the first embodiment of the high-intensity discharge lamp lighting circuit according to the present invention.

FIG. 8 is a circuit diagram showing lighting circuit means in a first embodiment of the high-intensity discharge lamp lighting device according to the present invention.

Shown in FIG. 8 is a high-intensity discharge lamp lighting device using the lighting circuit means for the fluorescent lamp that is principally constituted of the half-bridge high-frequency inverter.

In FIG. 8, AS denotes an AC power source: f denotes an over current protection fuse; NF denotes a noise filter; RD denotes a rectified DC power source; Q1 denotes a first switching device Q2 denotes a second switching device: GD denotes a gate drive circuit ST denotes a starting circuit GP denotes a gate protection circuit: and LC denotes a load circuit.

The AC power source AS is a commercial 100 V power source.

The over-current protection fuse f is a print fuse formed on a printed circuit board, and it protects the circuit not to be burnt when an excessive current has flown.

The noise filter NF is comprised of as inductor L1 and a capacitor C1, and eliminates high-frequency components occurring with the operation of the high-frequency inverter from their leak to the power supply side.

The rectified DC power source RD is comprised of a bridge rectifier BR and a smoothing capacitor C2. AC input terminals of the bridge rectifier BR are coupled to an AC power source A via the noise filter NF and the over-current protection fuse f; and DC output terminals are coupled across a smoothing capacitor C2, output a smoothed DC current.

The first switching device Q1 is comprised of an N-channel MOSFET. Then, its drain is coupled to the positive pole terminal of the smoothing capacitor C2.

The second switching device Q2 is comprised of a P-channel MOSFET. Then, its source is coupled to the source of the first switching device Q1, while its drain is coupled to the negative pole terminal of the smoothing capacitor C2.

Accordingly, the first and the second switching device Q1 and Q2 are coupled in series in order, and their respective terminals are coupled across the output terminals the rectified DC power source RD.

The gate drive circuit GD is comprised of a feedback circuit FGC, a aeries resonance circuit SOC, sad a gate voltage output circuit GO.

The feedback circuit FBC is comprised of as auxiliary winding that is magnetically coupled to a current limiting inductor L2.

The aeries resonance circuit SOC is comprised of a series circuit of an inductor L3 and a capacitor C3. And its two ends are coupled to the feedback circuit FBC.

The gate voltage output circuit GO is constituted for outputting a resonance voltage appearing across the capacitor C3 of the series resonant circuit SO via a capacitor C4. Then, one end of the capacitor C4 is coupled to the coupling node of the capacitor C3 and the inductor L3, and the other end is coupled to the gates of the first end the second switching devices Q1 and Q2. Further, the other end of the capacitor C8 is coupled to the sources of the first and the second switching devices Q1 and Q2. Accordingly, the resonance voltage applied to both ends of the capacitor C3 is applied across the gates and the sources of the first and the second switching devices Q1 and Q2 via the gate voltage output circuit GO.

The starting circuit ST is comprised of resistors R1, R2 and R3.

One end of the resistor R2 is connected to the positive terminal of the smoothing capacitor C2, and the other end is connected to the gate of the first switching device Q1 and to one end of the resistor R2 and to the output end at the aide of the gate of the gate voltage output circuit GO of the gate driving circuit GD, i.e., the other end of the capacitor C4.

The other end of the resistor R2 is connected to the connection node of the inductor L3 of the series resonance circuit SOC and the feedback circuit FBC.

One end of the resistor R3 is connected to both of the first and the second switching devices Q1 and Q2, i.e., the sources of the switching devices Q1 and fat and the source of the gate voltage output circuit GO. While the other end of the resistor R3 is connected to the negative terminal of the smoothing capacitor C2.

The gate protection circuit GP is comprised of a pair of zener diodes connected in series and their opposite pole terminals are connected to each other, and are connected in parallel to a gate voltage output circuit GO.

The load circuit LC is comprised of a series circuit of the high-intensity discharge lamp HD, the current limiting inductor L2 and a DC-blocking capacitor C5, and a resonance capacitor C6 which is connected in parallel to the high-intensity discharge lamp HD. One end of the load circuit LC is connected to the connection node of the first and the second switching devices Q1 and Q2, and the other end is connected to the drain of the second switching device Q2.

The high-intensity discharge lamp HDL is constituted as shown in FIG. 3.

The current limiting inductor L2 and the resonance capacitor C6 form together a series resonance circuit. Here, the DC-blocking capacitor C5 has a large capacitance, and thus does not significantly affect the series resonance.

A capacitor C7 connected across the drain and the sources of the second switching device Q2 reduces a load during the switching operation of the second switching device Q2.

Now the operation of the lighting circuit means will be explained.

When the AC power source AS is powered-on, the DC voltage smoothed by the rectified DC power source RD appears across the smoothing capacitor C2. Then, the DC voltage is applied between both drains of the first and the second switching devices Q1 and Q2 that is connected in serial. However, both switching means Q1 and Q2 are turned off since the gate voltage is not applied.

Since the DC voltage as mentioned above is applied to the starting circuit ST at the same time, the voltage according to the proportional distribution of the resistance of the resistors R1, R2 and R3 principally is applied to both ends of the resistor R2. Then, the terminal voltage of the resistor R2 is applied to between gate and the source of the first and the second switching device Q1 as the positive voltage.

As the result, since the first switching device Q1 is set to excess the threshold voltage turns ON. However, since the voltage applied across the gate and the source of the second switching device Q2 has a polarity reversed to the gate voltage, the second switching device Q2 stays in a turned-off state.

When the first switching device Q1 turns ON, a current flows to the load circuit LC from the rectification DC supply AD via the first switching device Q1. Accordingly, the higher resonance voltage appears across the terminals of the resonance capacitor C6 due to the resonance of the series resonance circuit of the current limiting inductor L2 and the resonance capacitor C6, and then the resonance voltage is applied to the high-intensity discharge lamp HD.

On the other hand, by the current flowing in the current limiting inductor L2 s voltage is induced in the feedback circuit FBC that is magnetically coupled to the current limiting inductor L2.

Accordingly, since a boosted negative voltage is generated in the capacitor CS b the series resonance of the aeries resonance circuit SOC, the voltage is clipped to a filed voltage in the gate protection circuit GP, and applied across the gate and the source of the first and the second switching devices Q1 and Q2 via the gate voltage output circuit GO.

Since the clipped fixed voltage exceeds the threshold voltage of the second switching device Q2, the second switching device Q2 turns ON.

On the contrary, the first switching device Q1 turns OFF since the gate voltage reverses its polarity.

When the second switching device Q2 turns ON, and electromagnetic energy stored in the current limiting inductor 12 of the load circuit LC and a charge stored in the capacitor C5 are released, and a current flows in the reverse direction in the load circuit from the current limiting inductor L2 vie the second switching device Q2. Then a reverse polarity of a high resonant voltage appears across the capacitor C6 and ten applied to the high-intensity discharge lamp HDL. Hereinafter, the operations as mentioned above are repeated.

By the way, since the half-bridge high-frequency inverter operates at the frequency that is relatively close to the resonance frequency of the aeries resonance circuit comprised of the current limiting inductor L2 and the capacitor C6, before the high-intensity discharge lamp HDL stare, the secondary open-circuit voltage is about 550 V (effective value). That is, the secondary open-circuit voltage is about 1.6 kVp·p, and set to the voltage almost the same as the discharge starting voltage of the high-intensity discharge lamp HDL.

Figure 1:
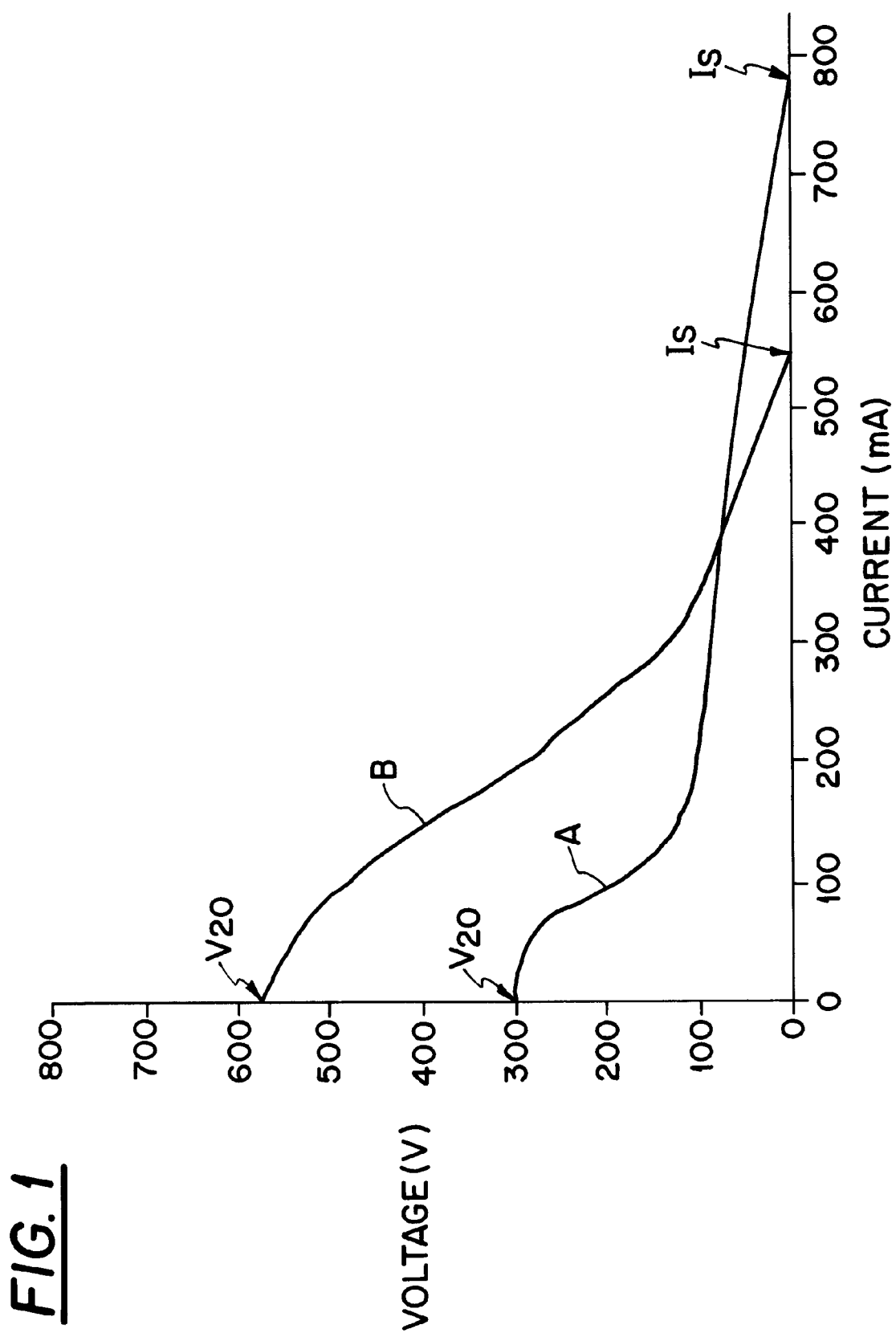
FIG. 1 is a graph illustrating load characteristics of high-intensity discharge lamp lighting circuit means and fluorescent lamp lighting circuit means.

Further, since the secondary short-circuit is about 550 mA, the load characteristics smoothly extends from the secondary open-circuit voltage to the secondary short-circuit current, similar to the characteristic curve B in FIG. 1.

Accordingly, even if the igniter for generating the pulse voltage would not be used, the high-intensity discharge lamp HDL will start lighting in a short time. After a certain time, the glow-arc transition occurs, and then the rated lamp current value on the load characteristics graph moves to an operating point so as that the high-intensity discharge lamp HDL starts a stable lighting. Here, as the high-intensity discharge lamp has the configuration, as shown in FIG. 1, the blackening hardly occurs at the starting operation.

Figure 9:
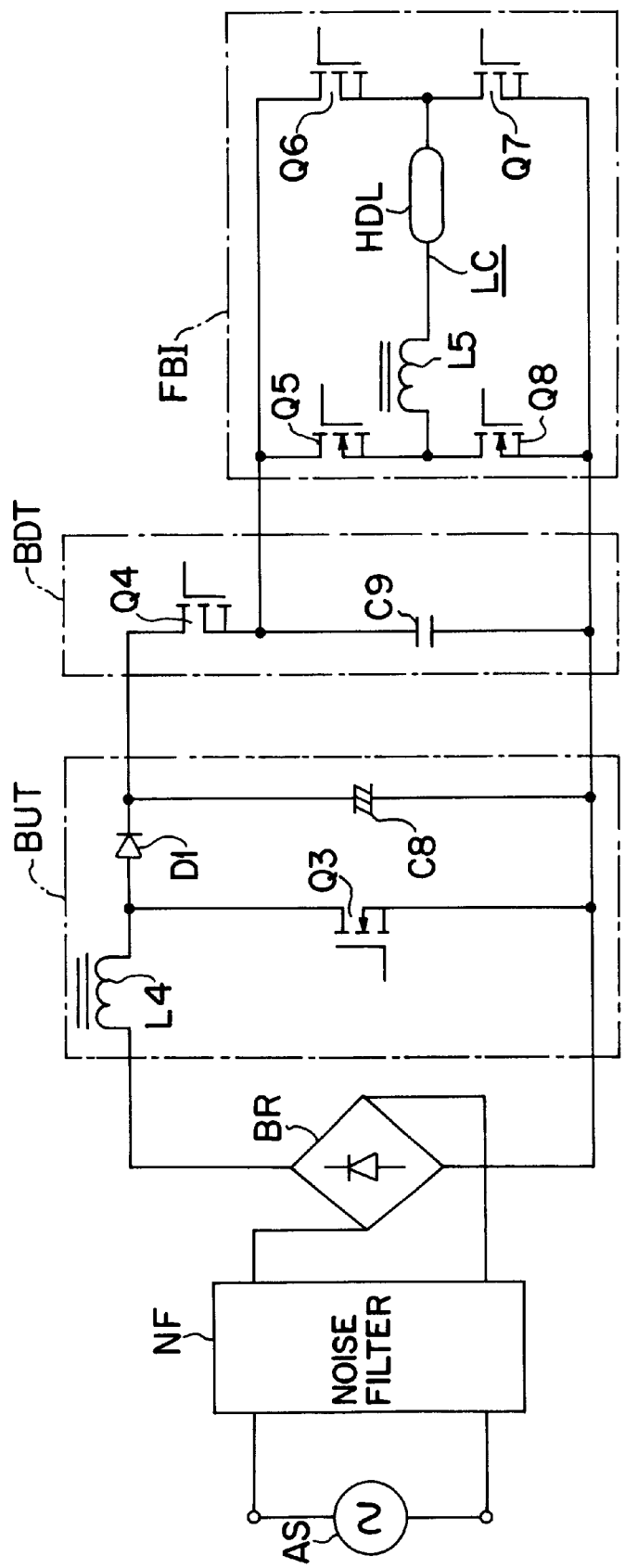
FIG. 9 is a block diagram showing a lighting circuit means for use with a second embodiment of the high-intensity discharge lamp lighting circuit according to the present invention.

FIG. 9 is a circuit diagram showing lighting circuit means for use with a second embodiment of the high-intensity discharge lamp lighting device according to the present invention.

In FIG. 9, the same elements as those shown in FIG. 8 are assigned with same codes and omitted their explanation.

This embodiment differs from the first embodiment by that it is principally constituted by a full-bridge high-frequency inverter FBI.

BUT denotes a step-up chopper; BDT denotes a step-down chopper: and FBI denotes the full-bridge high-frequency inverter.

The step-up chopper BUT is comprised of an inductor L4, a switching device Q3, a diode D1 and a smoothing capacitor C8. A smoothed DC voltage of about 580 V that is boosted over the rectified non-smoothed DC supply voltage appears across the smoothing capacitor C8.

The step-down chopper BDT is comprised of a switching device Q4 and a capacitor C9. The step-down chopper BDT is controlled for performing a constant-voltage control while changing the output voltage by the integrating operation of the capacitor C9 by making variable the on-duty of the switching device Q4.

The full-bridge high-frequency inverter FBI is comprised of four switching devices Q5, Q6, Q7 and Q8 in bridge, and it connects its input terminal to both ends of the capacitor C9 of the step-down chopper BDT and connects the load circuit LC between its output terminals. Here, the inductor L6 of the load circuit LC reduces the peak of the current at the time when the switching device Q3 or Q6 turns ON. In case of the full-bridge inverter, it does not need the current limiting inductor.

The full-bridge high-frequency inverter FBI is able to adjust the output voltage by varying the input DC voltage. Then, the full-bridge high-frequency inverter FBI outputs about a 680 V at the starting time of the high-intensity discharge lamp HDL, and about a 75 V during the 11c, and a supporting portion 11d.

Figure 10:
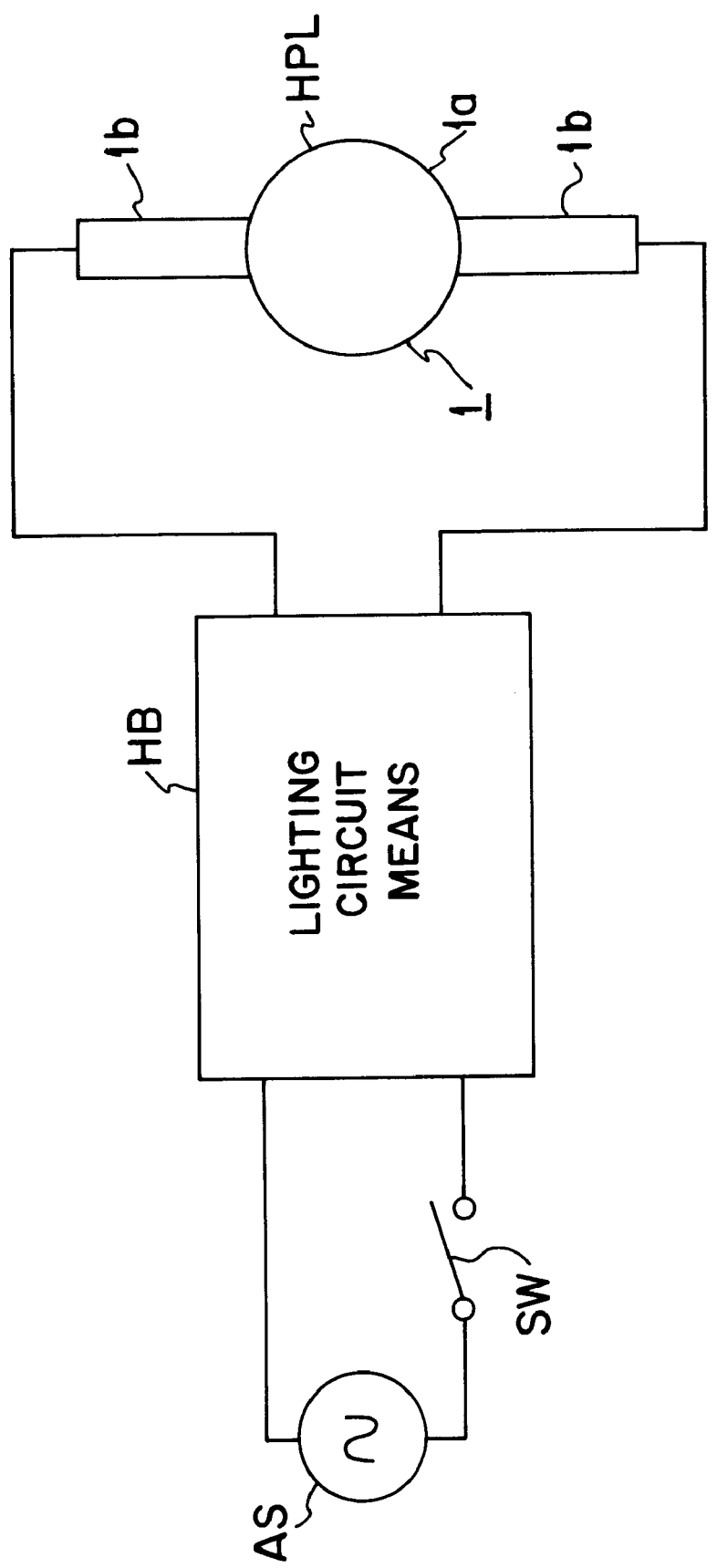
FIG. 10 is a block diagram showing a lighting circuit means for use with a third embodiment of the high-intensity discharge lamp lighting circuit according to the present invention.

FIG. 10 is a front view of alight bulb type high-intensity discharge lamp as a second embodiment of the lighting device according to the present invention.

In FIG. 10, AS denotes a low frequency AC power source: SW denotes a power switch HB denotes lighting circuit means: and HDL denotes a high-intensity discharge lamp.

The AC power source AS is a commercial 100 V power source.

The power switch SW turns ON or OFF lighting circuit means HB. The lighting circuit HB is principally constituted by an LC resonance type high-frequency inverter for supplying a high-frequency voltage to a high-intensity discharge lamp HDL. Further, the lighting circuit HB has a current limiting impedance.

FIG. 11 is a front view of the second embodiment of the high-intensity discharge lamp in the high-intensity discharge lamp lighting device according to the present invention.

FIG. 12 is a sectional view of the high-intensity discharge lamp in which only its top end is sealed.

In FIGS. 11 and 12, the same elements as those shown in FIG. 3 are assigned with same codes and omitted their explanation.

The high-intensity discharge lamp HDL is almost similar to the high-intensity discharge lamp in the first embodiment of the high-intensity discharge lamp lighting device according to the present invention as shown in FIG. 3, except a quality and a size.

Three radial protrusions 3a are integrated to the end of the small diameter cylinder portion 1b at 120 degrees intervals with each other. These radial protrusions 3a each has a tapered surface along the axis direction so as to not only serve a stopper for the feed-conductor 3 in bumping with the end of the small diameter cylinder portion 1b of the light-transmissive ceramic enclosure 1 but also regulate the feed-conductor 3 and the electrode 2 in a position coaxial to the small diameter cylinder portion 1b.

EXAMPLE 2

<High-intensity Discharge Lamp>
  Light-transmissive ceramic discharge enclosure 1: made of light-transmissive alumina ceramics; 24 mm in overall length
  Hollow portion: 6 mm in outer diameter; 5 mm in inner diameter, 0.5 mm in thickness
  Small diameter cylinder portion 1b: 1.7 mm in outer diameter; 0.7 mm in inner diameter; 0.5 mm in thickness
  Electrode 2: tungsten-based; 0.25 in diameter; 7 mm in exposed length 3 mm in inter-electrode distance
  Feed-conductor 3: made of niobium (in sealable portion) 0.64 mm in diameter Narrow gap g: 0.225 mm
  Sealant 4: 3.5 mm in sealing length over the coupling portion of the feed-conductor 3 and the electrode 2
  Discharge agent: 3% Ne+500 torr Ar in starting gas and buffer gas and proper quantity of mercury and halogen
<Lighting Circuit Means>
  Circuit arrangement: LC resonant type high-frequency inverter-based Lighting power frequency: 45 kHz
<Lighting Condition>
  Lamp power: 23 W
  Lamp voltage: 72 V
  Lamp current: 0.3 A FIG. 13 is a graph showing a relation between a glow-arc transition time and a luminous flux retention in the second embodiment of the high-intensity discharge lamp device according to the present invention.

Figure 13:
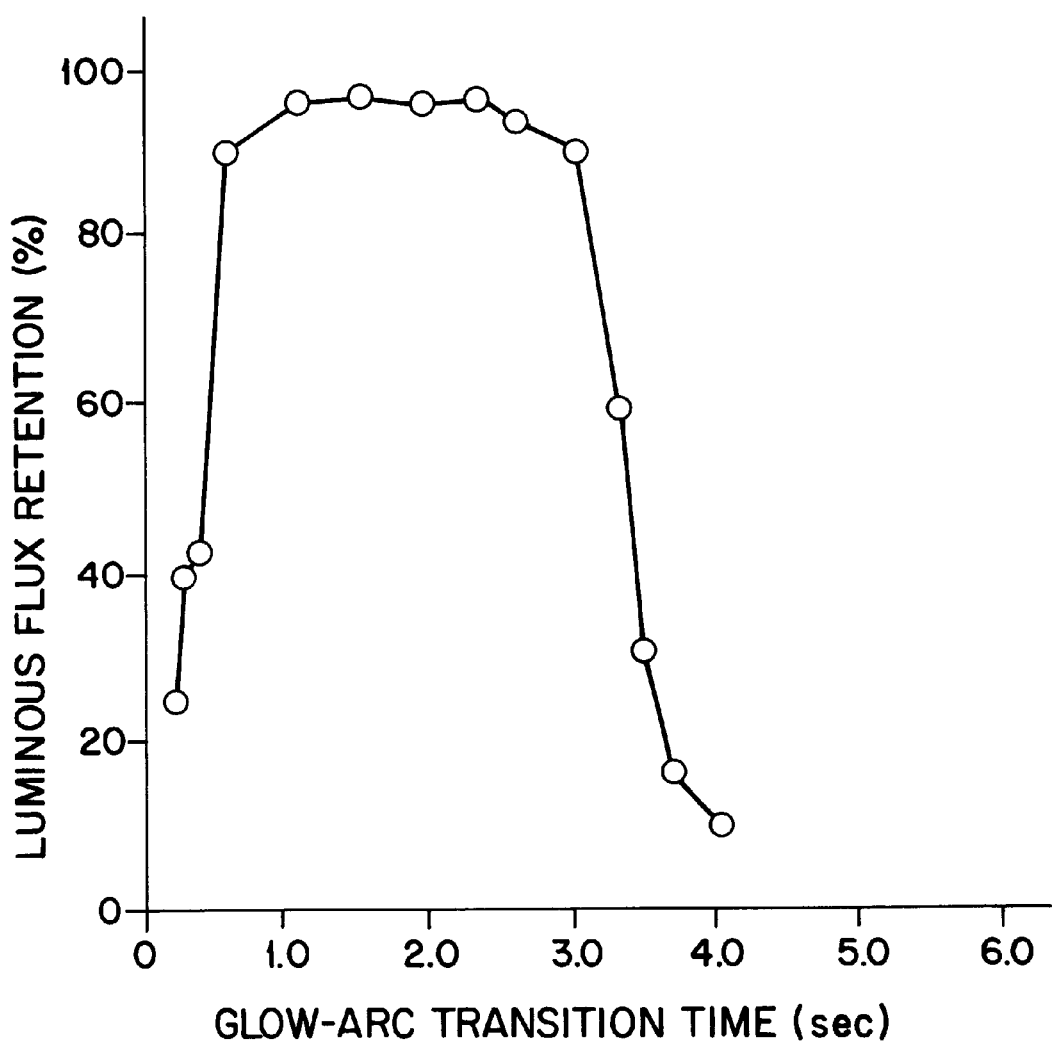
FIG. 13 is a graph showing a relation between a glow-arc transition time and a luminous flux retention in the fourth embodiment of the high-intensity discharge lamp device according to the present invention.

In FIG. 13, the vertical axis shows a glow-arc transition time (sec), and the horizontal axis shows a luminous flux retention ratio (%). Here, FIG. 13 also shows several examples of the high-intensity discharge lamp device with different glow-arc transition times for illustrating results obtained by measurement of the relations between a glow-arc transition time and a luminous flux retention, in which the examples of the high-intensity discharge lamps were repeated the cycle of lighting 165 min and delighting of 5 min for total of 3,000 hrs.

As seen from the graph of FIG. 13, an apparent difference is acknowledged between the glow-arc transition time and the luminous flux retention. If the glow-arc transition time is in a range of 0.5–3.0 sec, it is acknowledged that the luminous flux retention increase to 80% or more.

Furthermore, if the glow-arc transition time is in a range of 1.0–2.5 sec, it is acknowledged that the luminous flux retention increases to 90% or more.

Figure 14:
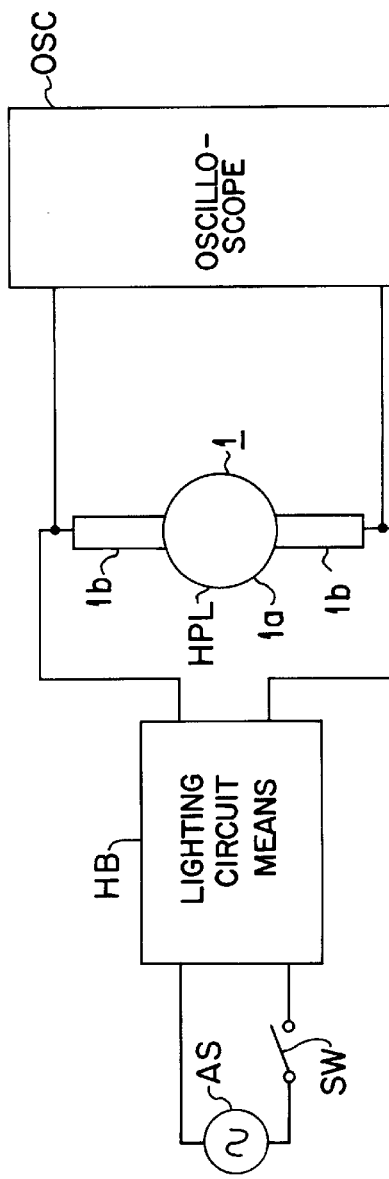
FIG. 14 shown a circuit diagram for explaining a scheme for measuring the glow-arc transition time of the high-intensity discharge lamp in connection with the fourth embodiment of the high-intensity discharge lamp device according to the present invention.

FIG. 14 shows a circuit diagram for explaining a scheme for measuring the glow-arc transition time of the high-intensity discharge lamp in connection with the second embodiment of the high-intensity discharge lamp device according to the present invention.

In FIG. 14, OSC denotes a storage-type oscilloscope.

Test terminals of the oscilloscope OSC are connected to both ends of the high-intensity discharge lamp HDL. A time elapsed is counted from the turning ON of the switch SW for supplying power to the stabilizer HB until both of the electrodes having changed to a glow-arc state by monitoring the change of the lamp voltage waveform.

Figure 15:
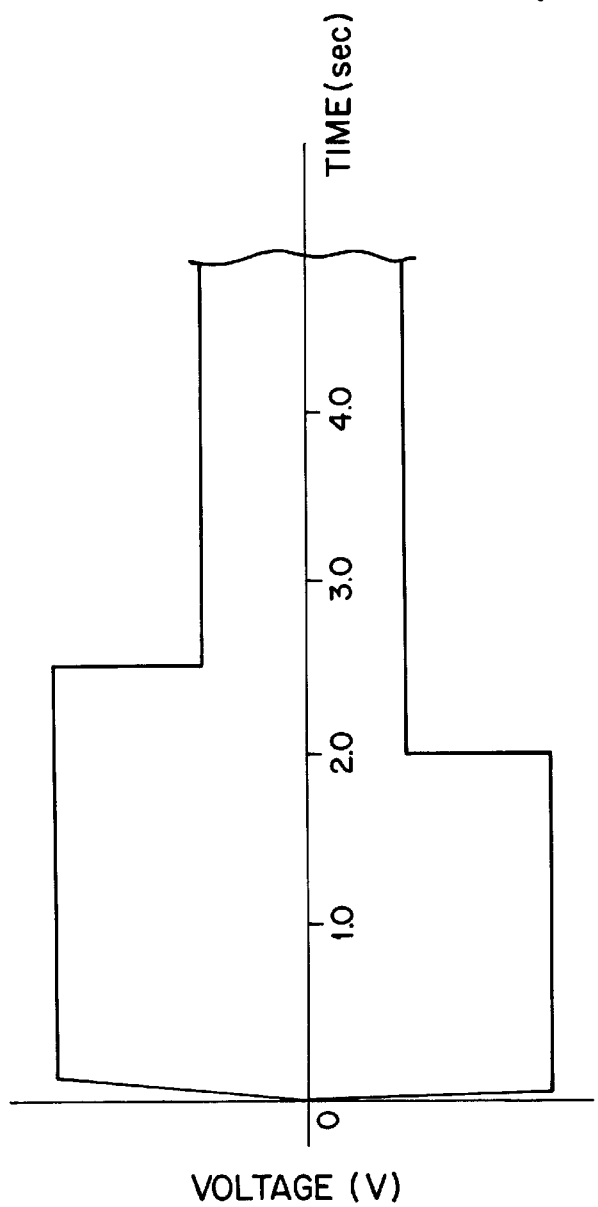
FIG. 15 is a schematic waveform diagram showing the lamp voltage waveform of the high-intensity discharge lamp in connection with the fourth embodiment of the high-intensity discharge lamp device according to the present invention.

FIG. 15 is a schematic waveform diagram showing the lamp voltage waveform of the high-intensity discharge lamp in connection with the first embodiment of the high-intensity discharge lamp device according to the present invention.

In FIG. 15, the horizontal axis represents a time (sec), and the vertical axis represents a voltage. FIG. 15 also illustrates an example in that the power switch SW has been turned ON at a time 0, and one electrode turned to the glow-arc state after 2 sec, while the other electrode has changed to the glow-arc state after 2.5 sec. Accordingly, FIG. 15 shows the example of the glow-arc transition time being 2.5 sec. Here the example of the high-intensity discharge lamp transfers into a stable lighting state after that glow-arc transition time.

Figure 16:
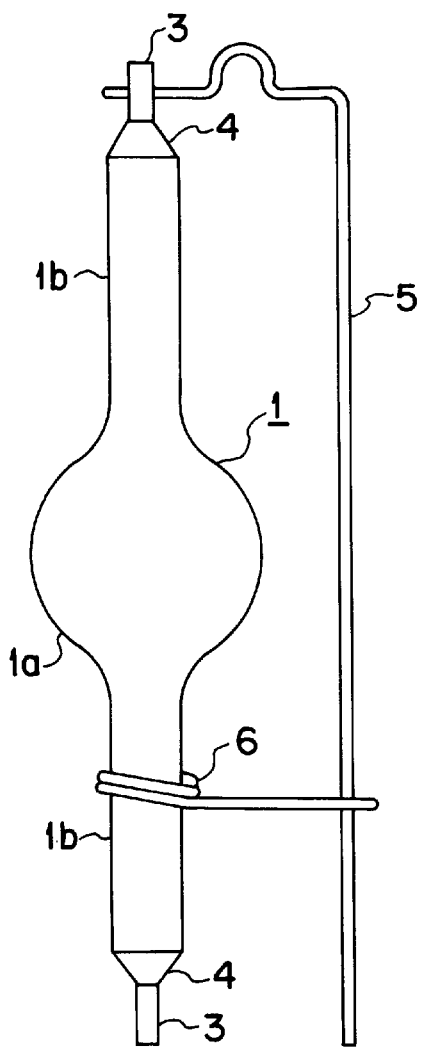
FIG. 16 is a front view of the fifth embodiment of the high-intensity discharge lamp device according to the present invention.

FIG. 16 is a front view of the third embodiment of the high-intensity discharge lamp device according to the present invention.

In FIG. 16, the same elements as those shown in FIG. 11 are assigned with same codes and omitted their explanation.

In FIG. 16, 5 denotes a stem conductor: and 6 denotes starting-assist conductor.

The stem conductor 5 is made of molybdenum, and having an upper end connected to a feed-conductor and a base end to be connected to the lighting circuit means (not shown).

The starting-assist conductor 6 is also made of molybdenum, and having a base end welded to the stem conductor 5 and a leading end wound on the middle of the small diameter cylinder portion 1b that wrap around a lower electrode (not shown).

In this embodiment as shown in FIG. 16, as an output voltage from the lighting circuit means is applied across the lower electrode and the starting-assist conductor 6 at a starting operation and thus the electric field across them increases, a dielectric breakdown of the discharge agent is accelerated. As a result, the high-intensity discharge lamp starts at a relatively low voltage.

Here, the high-intensity discharge lamp of the embodiment is accommodated in an outer bulb (not shown).

Figure 17:
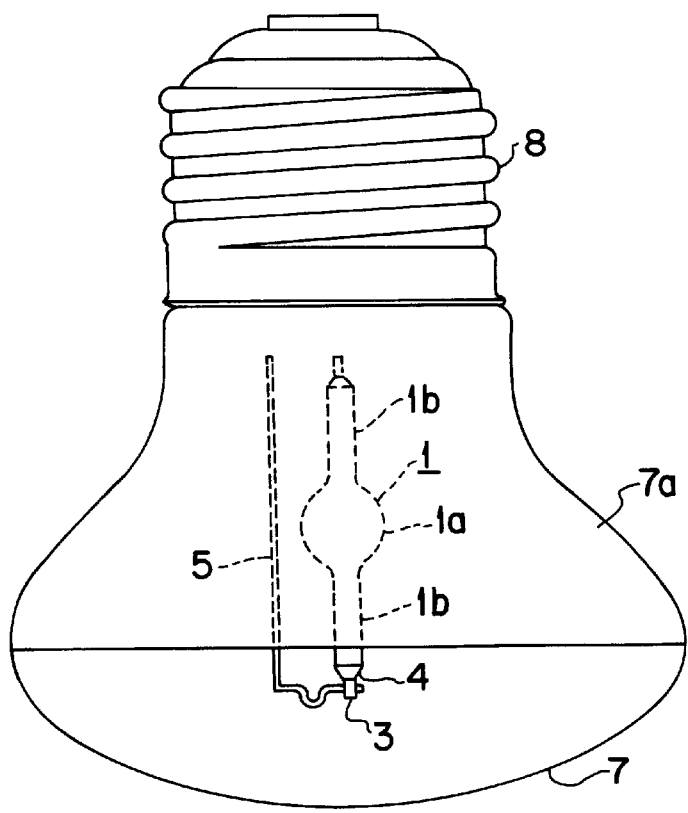
FIG. 17 is a front view of the high-intensity discharge lamp in a sixth embodiment of the high-intensity discharge lamp according to the present invention.

FIG. 17 is a front view of the high-intensity discharge lamp in a fourth embodiment of the high-intensity discharge lamp according to the present invention.

In FIG. 17, the same elements as those shown in FIG. 16 are assigned with same codes and omitted their explanation.

In FIG. 17, 7 denotes an outer bulb; and 8 denotes bulb-base.

The outer bulb 7 has an R-letter shape. As shown in FIG. 17, the outer bulb 7 is provided with a reflection surface 7a inside thereof except its bottom end, and exhausted into a vacuum state. The reflection surface 7a is evaporated with aluminum.

Further, the outer bulb 7 accommodates therein the light-transmissive ceramic enclosure 1 as shown in FIG. 16. The envelope 1a of the light-transmissive ceramic enclosure 1 is fixed at a focal point of the reflection surface 7a.

The bulb-base 8 is the type of an E26 screw base which is adhered to a neck 7b of the outer bulb 7 with a non-organic adhesive.

Figure 18:
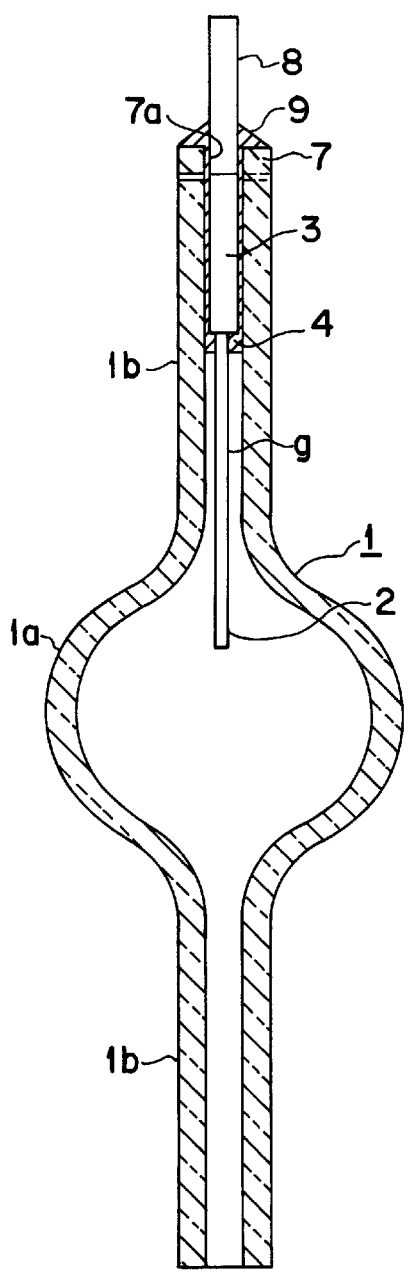
FIG. 18 is a sectional view of the high-intensity discharge lamp in a seventh embodiment of the high-intensity discharge lamp according to the present invention, showing a detail of only the upper portion thereof.

FIG. 18 is a sectional view of the high-intensity discharge lamp in a fifth embodiment of the high-intensity discharge lamp according to the present invention, showing a detail of only the upper portion thereof.

In FIG. 18, the same elements as those shown in FIG. 3 are assigned with same codes and omitted their explanation.

As shown in FIG. 18, the high-intensity discharge lamp is comprised of a light-transmissive ceramic enclosure 1, a pair of electrodes 2, a feed-conductor 3, a first sealant 4 and discharge agent contained in the enclosure (not visible in FIG. 18), a ceramic washer 7, an external lead wire 8 and a second sealant 9.

FIG. 18 shows an assembled condition wherein only the upper portion of the enclosure is assembled with other elements and sealed therewith for only for pedagogical purposes. However, the high-intensity discharge lamp is actually symmetric in the vertical direction. Further, the first sealant 4 is the same as the sealant 4, as shown in FIG. 3.

Figure 2:
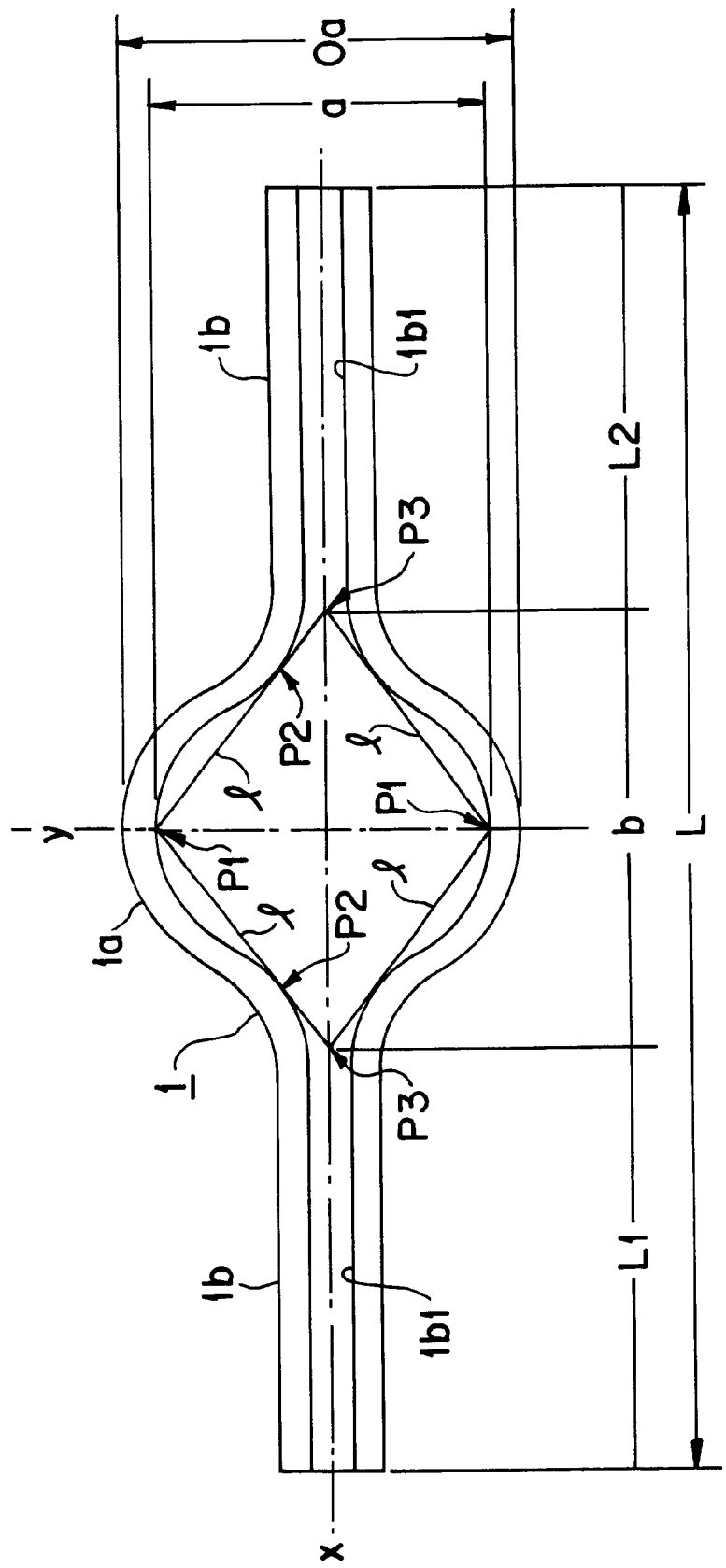
FIG. 2 is a schematic diagram for explaining a sphericity of an envelope of the discharge lamp according to the present invention.

The envelope 1a of the light-transmissive ceramic enclosure 1 has a spherical shape, as like the explanation in reference to FIG. 2.

The ceramic washer 7 is defined with a center bore 7a and fits around a coupling portion of the feed-conductor 3 and the external lead wire 8.

The external lead wire 8 is made of anti-acid metal, and welded on the base end of the feed-conductor 3.

The second sealant 9 fits around the base end exposing outwards from the small diameter cylinder portion 1b of the feed-conductor 3 at a center of the inside the center bore 7a of the ceramic washer 7. Thus, the feed-conductor 9 is wholly covered with the first and the second sealants 4, 9.

For the discharge agent, halide of light radiating metal, mercury and rare gas are filled in the discharge lamp enclosure.

EXAMPLE 3
<High-intensity Discharge Lamp>

Light-transmissive ceramic discharge enclosure 1: made of light-transmissive alumina-ceramics; 24 mm in overall length Hollow portion: 6 mm in outer diameter; 5 mm in inner diameter, 0.5 mm in thickness Small diameter cylinder portion 1b: 1.7 mm in outer diameter; 0.7 mm in inner diameter, 0.5 mm in thickness Light-transmissive ceramic discharge enclosure 1: Material: made of light-transmissive ceramics Overall length: 28 mm Enclosure 1a: 6.6 mm in exterior diameter; 5.5 mm in interior diameter; 0.5 mm in thickness 0.087 cc in interior volume; 0.68 in sphericity; 7.2 mm in axial length Small diameter cylinder portion 1b: 1.7 mm in exterior diameter; 0.7 mm in interior diameter; 0.5 mm in thickness; 9 mm in length Weight: 386 mg Electrode 2: tungsten-based; 0.25 in diameter 7 mm in exposed length; 3 mm in inter-electrode distance Narrow gap g: 0.225 mm Feed-conductor 3: made of niobium 0.64 mm in diameter: 3.5 mm in insertion depth into small diameter cylinder portion 1b External lead wire 8: made of Fe—Ni—Co alloy: 0.64 mm in diameter; 5.5 mm in length First sealant 4: Al2O3-SiO2-Dy23 system ceramics sealing compound or frit glass; 1500° C. in melting point Ceramic washer 7: made of alumina ceramics Second sealant 9: CaO—BaO—SiO system adhesive glass or frit glass; 1045° C. in melting point Discharge agent 150 torr of Ne 3%+Ar 97% mixed gas in starting gas and buffer gas Buffer vapor: 1.5 mg of mercury Compound of light radiating metal: 1.4 mg of NaI—TlI—DyI3 at mol-ratio of 71:8:21

Lamp power: 20 W

Lamp weight: 487 mg

Lamp power (W)/Weight (mg) of light-transmissive ceramic discharge enclosure: 0.0518 (W/mg)

Lamp power (W)/Weight (mg) of high-intensity discharge lamp: 0.0411 (W/mg)

Inclusion amount of discharge agent per interior volume of enclosure: 16.09 (mg/cc)

Ratio of inter-electrode distance gE versus axial length b of enclosure 1a: 0.427

<Lighting Circuit Means>

Circuit arrangement: LC resonant type high-frequency inverter-base, with a half-bridge circuit complementary-wired with a pair of switching elements Lighting frequency: 45 kHz <Lighting Condition>

Lamp voltage: 70 V

Lamp current: 0.26 A

Lamp efficiency: 781 m/W

Continuous duty lifetime: 7,000 hrs

Figure 19:
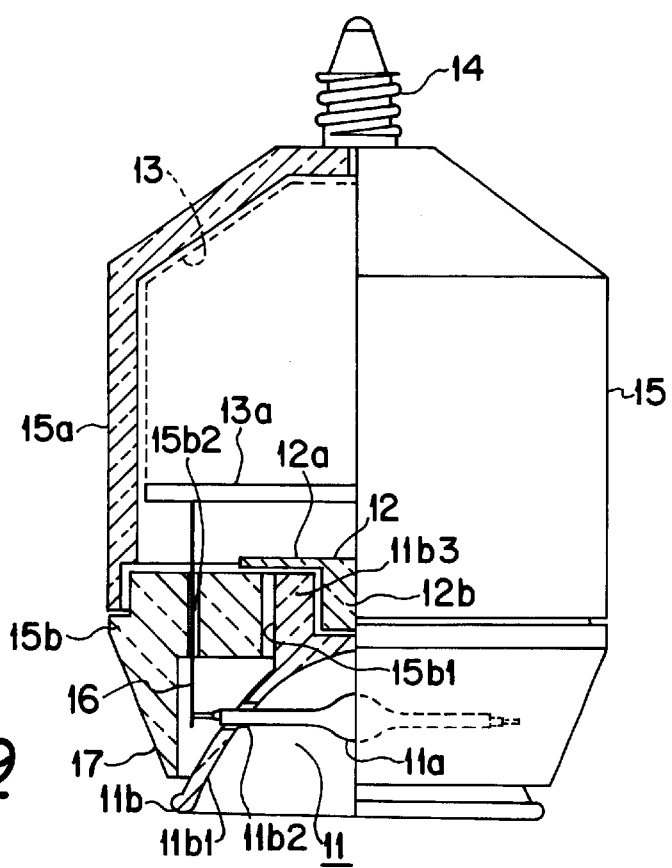
FIG. 19 is a front view of alight bulb type high-intensity discharge lamp as a first embodiment of the lighting device according to the present invention.

FIG. 19 is a front view of a light bulb type high-intensity discharge lamp as a first embodiment of the lighting device according to the present invention.

In FIG. 19, the same elements as those shown in FIG. 18 are assigned with same codes and omitted their explanation.

In FIG. 19, 11 denotes the high-intensity discharge lamp; 12 denotes the fixing means; 13 denotes the lighting circuit means; 14 denotes the power receiving means; 15 denotes the case; 16 denotes a connecting line; and 17 denotes the protector.

The high-intensity discharge lamp 11 is comprised of a high-intensity discharge lamp 11a and a reflector 11b.

The high-intensity discharge lamp 11a is applying the one shown in FIG. 18.

The reflector 11b is provided with a reflection surface 11b1, a pair of bore 11b2 and a supporting portion 11b3.

The reflection surface 11b1 has a rotating parabolic surface.

A pair of bore 11b is formed on a specific position of a reflection surface 11b1 and it gets through from inner surface to outer surface of the reflection surface 11*b*1. The specific position is where crosses the reflection surface 11*b*1 in vertical direction and crosses the focus also. The supporting portion 11*b*3 is formed cylindrical form and protrudes from the backside of the reflection mirror 11*b*1.

So, the small diameter cylinder portion 1*b* at both ends of the high-intensity discharge lamp 1 a are inserted into a pair of bore 11*b*2 of the reflector 11*b*, so that both of them are integrated together.

The fixing means 12 is integrated with a board portion 12*a* and a bolt body portion 12*b*.

The around of the board portion 12*a* is bumped with a back surface of a cover body 15*b* of the case 15.

The bolt body portion 12*b* is inserted in the supporting portion 11*b*3 of the reflector 11*b* of the high-intensity discharge lamp 11 and adhered there so as to adhere the high-intensity discharge lamp device 11 with a cover body 15*b*.

The lighting circuit means 13 is provided with the load characteristics of the fluorescent lamp, containing the high-frequency inverter and the current limiter, and it lights the high-intensity discharge lamp 11*a* with high-frequency. And, the discharge lamp lighting device 13 is located on the back surface of the reflector 11*b*. Here, 13*a* denotes a print circuit board.

The power receiving means 14 is comprised of E11 type screwed bulb-base, and it receives the power when the screwed bulb-base is loaded into the lamp socket (not shown in drawing) so as to energize the discharge lamp lighting device 13.

The case 15 accommodates the components mentioned above and holds them at a specific position. And the case 15 is comprised of the case main body 15*a* and cover body 15*b*. The top portion is formed in a truncated cone and bottom portion is formed an open cylinder form. And, the discharge lamp lighting device 13 is accommodated in the case main body 15*a*. The power receiving means is located on the flat top of the case 15.

The cover body 15*b* is adhered to the bottom end of the case main body 15*a* by engaged with] by an adhesive (not shown in drawing). And, the opening 15*b*1 is formed at the center of the cover body 15*b*, wherein the high-intensity discharge lamp device 11 is accommodated. Further, at the cover body 15*b*, the through-hole 15*b*2 is formed where the connecting wire 16 is put through.

The connection wire 16 extends from the discharge lamp lighting device 13 that is accommodated in the case 15 to the external lead wire of the high-intensity discharge lamp HDL through the through-hole 15*b*2 of the cover body 15*b*.

The protector 17 is integrated with the cover body 15*b*.

And, the protector 17 arises from around of the high-intensity discharge lamp device 11 so as to protect the reflector 12 and the portion that exposes outside from the reflector 12 of the high-intensity discharge lamp HDL and connecting wire 16 by enveloping them.

Figure 20:
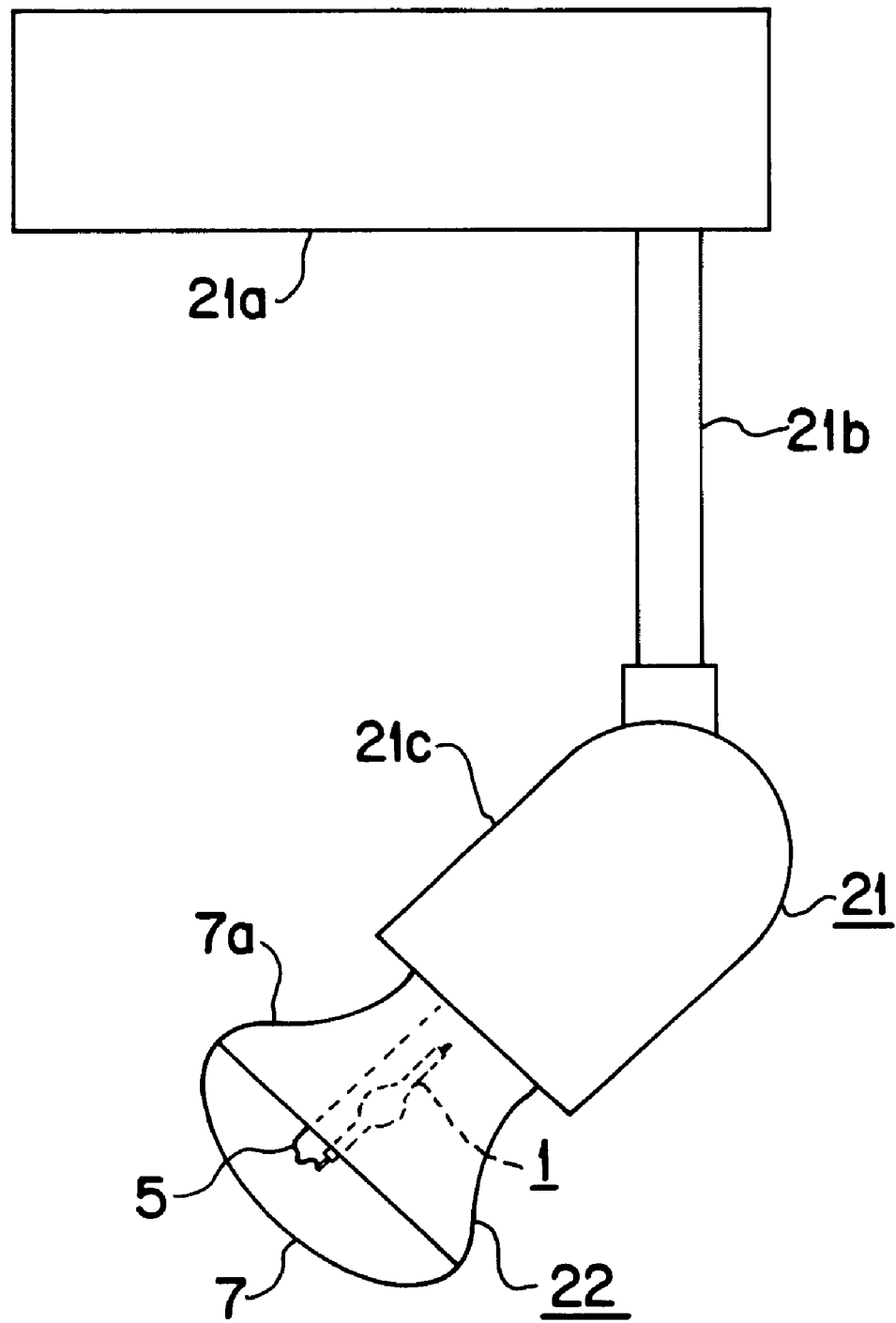
FIG. 20 is a front view of a spotlight type high-intensity discharge lamp as a fourth embodiment of the lighting equipment according to the present invention.

FIG. 20 is a front view of a spotlight type high-intensity discharge lamp as a third embodiment of the lighting equipment according to the present invention.

In FIG. 20, the same elements as those shown in FIG. 19 are assigned with same codes and omitted the explanation.

In FIG. 20, 21 denotes a lighting system main body.

The lighting system main body 21 is provided with a base stand 21*a*, a pole 21*b*, and a lighting body 21*c*.

The base stand 21*a* is configured to be hanged directly from a ceiling or hanged via the lighting induct, and it is accommodating the discharge lamp lighting device (not shown) inside.

The pole 21*b* supports the lighting body 21*c* by suspending it from the base stand 21*a*. Further, the pole 21*b* accommodates therein an insulator-coated lead-wire (not shown) for connecting the discharge lamp lighting device to the light body 21*c*.

The lighting body 21*c* accommodates therein a lamp socket (not shown).

The high-intensity discharge lamp HDL is constituted as shown in FIG. 17.

By loading the bulb-base of the high-intensity discharge lamp HDL into a lamp socket (not shown) located in the interior of the lighting body 21*c* of the lighting equipment main body 21, the high-intensity discharge lamp HDL lights at a high luminance. As the light from the high-intensity discharge lamp HDL is then collected on the reflection surface 7*a* of the outer bulb 7, it is able to illuminate a lighting object in goodness at a desired light distribution characteristics.

The lighting system main body 21 is provided with a base stand 21*a*, a pole 21*b*, and a lighting body 21*c*.

Here, it is also possible to be lighted desirably with the halogen lamp as good as the spot light using the halogen lamp.

According to the first to fourth aspects of the invention, it is possible to provide a high-intensity discharge lamp lighting device which is capable of suppressing a blackening caused by an evaporation of electrode materials at a starting time.

According to the first and second aspects of the invention, it is possible to provide a high-intensity discharge lamp lighting device which is capable of not only suppressing a blackening caused by an evaporation of electrode materials at a starting time, but also using a compact lighting circuit means.

According to the second aspect of the invention, it is possible to provide a high-intensity discharge lamp lighting device in which a glow power at a starting time is reduced.

According to the third aspect of the invention, it is possible to provide a high-intensity discharge lamp lighting device in which not only its output power is smoothly adjusted, but also it is compact in size and moderate in cost than ever before.

According to the fourth aspect of the invention, it is possible to provide a high-intensity discharge lamp lighting device that presents a high lamp efficiency and has a long lifetime.

According to the fifth aspect of the invention, it is possible to provide a high-intensity discharge lamp lighting device that is also capable of significantly suppressing a blackening at a starting time.

According to the sixth aspect of the invention, it is possible to provide a high-intensity discharge lamp lighting device that is also capable of significantly suppressing a blackening at a starting time.

According to the seventh aspect of the invention, it is possible to provide a high-intensity discharge lamp lighting device that is also capable of significantly suppressing a blackening at a starting time.

According to the eighth aspect of the invention, it is possible to provide a high-intensity discharge lamp lighting device which is also capable of significantly suppressing a blackening at a starting time, and in which it is compact in size than ever before.

According to the ninth aspect of the invention, it is possible to provide a high-intensity discharge lamp lighting device that is provided with a practical lighting circuit means for high-frequency lighting.

According to the 10th aspect of the invention, it is possible to provide a high-intensity discharge lamp lighting device that is suitable for a compact lighting device such as a light source for optical fibers, and is complementary with a halogen lamp.

According to the 11th and 12th aspects of the invention, it is possible to provide a high-intensity discharge lamp lighting device in which not only a blackening at a starting time is significantly suppressed and the size of the lighting circuit means is miniaturized, but also an acoustic resonance does not occur.

According to the 12th aspect of the invention, it is possible to provide a high-intensity discharge lamp lighting device in which a blackening at a starting time is also lowered.

According to the 13th aspect of the invention, it is possible to provide a high-intensity discharge lamp lighting device in which not only its output power is smoothly adjusted, but also it is compact in size and moderate in cost than ever before.

According to the 14th aspect of the invention, it is possible to provide a high-intensity discharge lamp lighting device in which not only its output power is smoothly adjusted, but also it is compact in size and moderate in cost than ever before.

According to the 15th aspect of the invention, it is possible to provide a lighting device with the effect(s) according to the first to 14th aspects of the invention.

As described above, the present invention can provide an extremely preferable high-intensity discharge lamp lighting device and the lighting system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it in intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high-intensity discharge lamp lighting device, comprising:
    a high-intensity discharge lamp containing;
        a light-transmissive discharge enclosure having an envelope defining a discharge space;
        a hollow member having an inner diameter smaller than said envelope;
        an elongate electrode being inserted into said hollow member of said light-transmissive discharge enclosure leaving a narrow gap from the inner wall of said hollow member and having a leading end protruding into said hollow member of said light-transmissive discharge enclosure;
        a lead-conductor having a leading end coupled to a base end of said electrode;
        a middle portion attached to said light-transmissive discharge enclosure;
        a base end exposing outward from said light-transmissive discharge enclosure; and
        a discharge agent including at least neon and argon at a charged gas pressure in a range of 50–580 torr and filled into said light-transmissive discharge enclosure; and
    a lighting circuit means having a load characteristic close to a discharge starting voltage of said high-intensity discharge lamp and continuous from a secondary open-circuit voltage to a secondary short-circuit current for lighting said high-intensity discharge lamp at a high-frequency, wherein said high intensity discharge lamp has a light-transmissive ceramic discharge enclosure having an envelope defining a discharge space and a small diameter cylinder portion defining a hollow member having an inner diameter smaller than said envelope, an elongate electrode being inserted into said hollow member of said light transmissive ceramic discharge enclosure leaving a narrow gap from the inner wall of said hollow member and having a leading end protruding into said hollow member of said light transmissive ceramic discharge enclosure, a lead conductor having a leading end coupled to a base end of said electrode for supporting said electrode and a base end exposing outward from said light-transmissive ceramic discharge enclosure, a sealing compound for sealing ceramics sealing said small diameter cylinder portion of said light-transmissive ceramic discharge lamp and said leading conductor together, and discharge agent including at least neon and argon and filled into said light transmissive ceramic discharge enclosure.

2. The high-intensity discharge lamp lighting device of claim 1 further comprising:
    lighting circuit means having a high frequency inverter provided with an LC resonator, for its key component.

3. The high-intensity discharge lamp lighting device of claim 2, wherein said high-intensity discharge lamp is charged with said discharge agent containing said neon and said argon with a gas pressure in a range of 100–200 torr.

4. The high-intensity discharge lamp lighting device of claim 3, wherein said light circuit means includes an LC resonance type high-frequency inverter.

5. The high intensity discharge lamp lighting device of claim 4, wherein said lighting circuit means has a secondary no-load voltage in a range of 1.0–3.0 kVp-p.

6. A lighting system, comprising:
    a lighting system main body; and
    a high-intensity discharge lamp as claimed in claim 3, which is mounted on said lighting device main body.

7. A high intensity discharge lamp lighting device, comprising a discharge lamp containing an envelop defining a discharge space, a light-transmissive ceramic discharge enclosure having a small diameter cylinder portion coupled to said envelope and an inner diameter smaller than said envelope, an elongate electrode being inserted into said small diameter cylinder portion in leaving a narrow gap from the inner wall of said small diameter cylinder portion of said light-transmissive ceramic discharge enclosure, and a discharge agent including at least neon and argon at a charged gas pressure in a range of 50–580 torr and filled into said light-transmissive ceramic discharge enclosure; and lighting circuit means for lighting said high-intensity discharge lamp at a high-frequency, wherein a glow arc transition time of said high-intensity discharge lamp is in a range of 0.5–3.0 sec.

8. The high-intensity discharge lamp lighting device of claim 7, wherein a glow-arc transition time of said high-intensity discharge lamp is in a range of 1.0–2.5 sec.

9. The high intensity discharge lamp lighting device of claim 8, further comprising a starting assist conductor located near said light-transmissive ceramic discharge enclosure.

10. The high-intensity discharge lamp light device of claim 9, wherein said light circuit means has an operation frequency in a range of 5–500 kHz at a stable lighting time of said high-intensity discharge lamp.

11. The high intensity discharge lamp lighting device of claim 10, wherein said high-intensity discharge lamp has a lamp power lower than 50 W.

12. A high-intensity discharge lamp lighting device, comprising:

a high-intensity discharge lamp having a light-transmissive ceramic enclosure with a spherical envelope at a sphericity of 0.6 or more for defining a discharge space, a pair of electrodes located in facing to an interior of said light-transmissive ceramic enclosure, and discharge agent including neon and argon and filled into said light-transmissive ceramic discharge enclosure; and lighting circuit means for lighting said high-intensity discharge lamp at an operating frequency in a range of 40–80 kHz.

13. The high intensity discharge lamp lighting device of claim 12, wherein a glow arc transition time of said high-intensity discharge lamp is in a range of 0.5–3.0 sec.

* * * * *